(12) United States Patent
Song

(10) Patent No.: US 11,126,552 B2
(45) Date of Patent: Sep. 21, 2021

(54) MEMORY SYSTEM, MEMORY CONTROLLER AND METHOD FOR OPERATING MEMORY CONTROLLER

(71) Applicant: SK hynix Inc., Gyeonggi-do (KR)

(72) Inventor: Min-O Song, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 16/677,360

(22) Filed: Nov. 7, 2019

(65) Prior Publication Data
US 2020/0341896 A1 Oct. 29, 2020

(30) Foreign Application Priority Data
Apr. 23, 2019 (KR) .................. 10-2019-0047013

(51) Int. Cl.
| | |
|---|---|
| *G06F 12/08* | (2016.01) |
| *G06F 12/0804* | (2016.01) |
| *G06F 12/1009* | (2016.01) |
| *G06F 12/02* | (2006.01) |

(52) U.S. Cl.
CPC ...... *G06F 12/0804* (2013.01); *G06F 12/0253* (2013.01); *G06F 12/1009* (2013.01); *G06F 2212/1016* (2013.01); *G06F 2212/304* (2013.01); *G06F 2212/652* (2013.01)

(58) Field of Classification Search
None
See application file for complete search history.

(56) References Cited

U.S. PATENT DOCUMENTS

| | | | | |
|---|---|---|---|---|
| 5,630,087 A | * | 5/1997 | Talluri | G06F 12/1027 711/202 |
| 5,860,146 A | * | 1/1999 | Vishin | G06F 12/0284 710/3 |
| 6,029,224 A | * | 2/2000 | Asthana | G06F 12/0607 710/119 |
| 6,330,654 B1 | * | 12/2001 | LaBerge | G06F 12/1027 711/207 |
| 2002/0116651 A1 | * | 8/2002 | Beckert | G06F 1/3225 713/300 |
| 2009/0070546 A1 | * | 3/2009 | Choudhury | G06F 11/2236 711/207 |
| 2015/0106545 A1 | * | 4/2015 | Godard | G06F 12/0811 711/3 |
| 2017/0269863 A1 | * | 9/2017 | Wada | G06F 3/0664 |

(Continued)

FOREIGN PATENT DOCUMENTS

| | | | | |
|---|---|---|---|---|
| EP | 0766177 A1 | * | 4/1997 | ............ G06F 12/08 |
| KR | 10-2010-0042455 | | 4/2010 | |

(Continued)

*Primary Examiner* — Kevin Verbrugge
(74) *Attorney, Agent, or Firm* — IP & T Group LLP

(57) ABSTRACT

Disclosed are a memory system, a memory controller and a method for operating a memory controller. The memory controller manages statuses of respective pages by referring to a first memory and a second memory, the first memory stores a valid page table which includes valid page checking information of the respective pages, and the second memory caches a cache table which includes information for updating a part of the valid page table and has a size smaller than the valid page table, whereby it is possible to improve write performance through effective management of page status information.

18 Claims, 29 Drawing Sheets

(56) References Cited

U.S. PATENT DOCUMENTS

2018/0101480 A1\* 4/2018 Abhishek Raja ... G06F 12/1009
2019/0129867 A1\* 5/2019 Zhang .................... G06F 21/78
2019/0227947 A1\* 7/2019 Keppel ............... G06F 12/1027

FOREIGN PATENT DOCUMENTS

KR   10-2018-0076276      7/2018
WO      WO-0045271 A1 \*  8/2000   ......... G06F 12/1045

\* cited by examiner

FIG.15
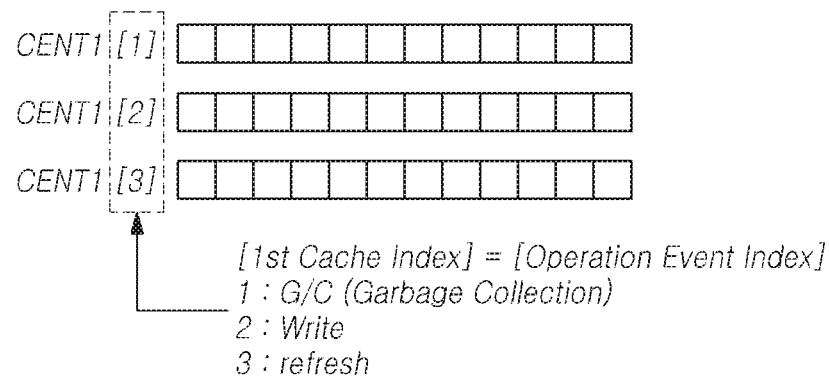
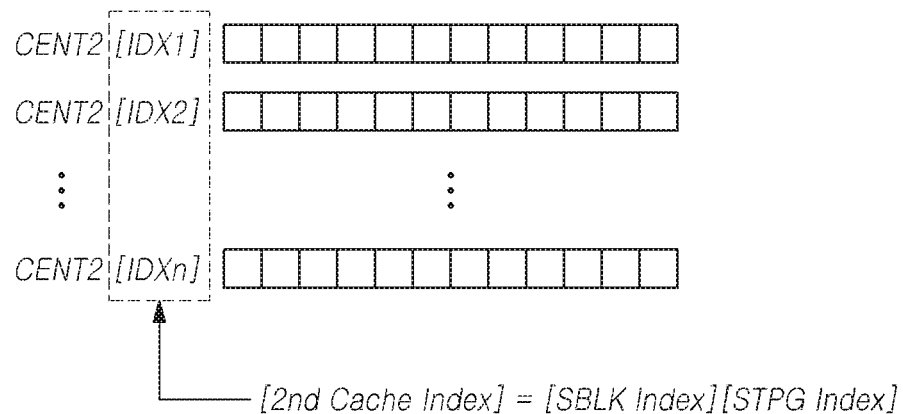

FIG. 17
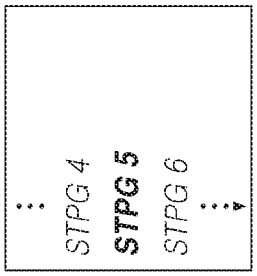
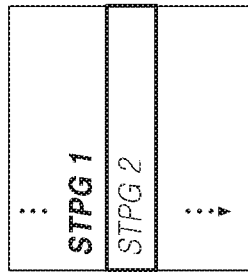
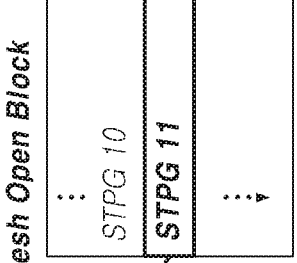
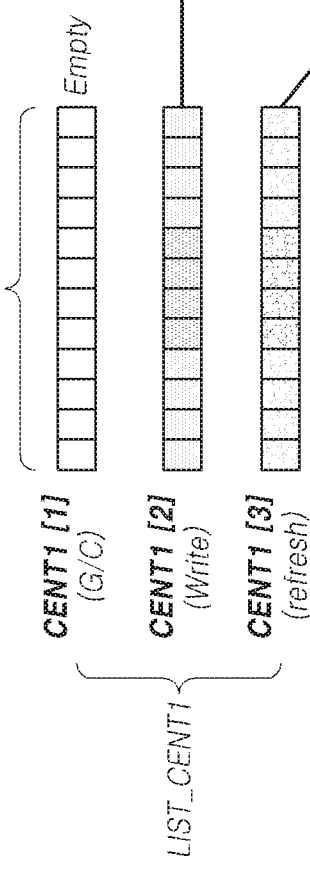

FIG. 19
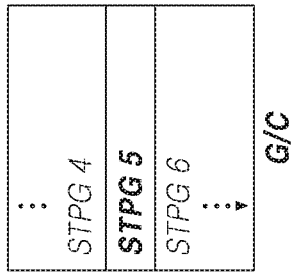
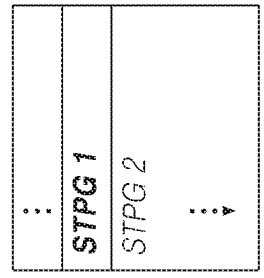
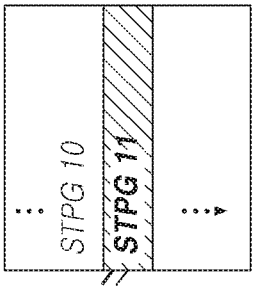
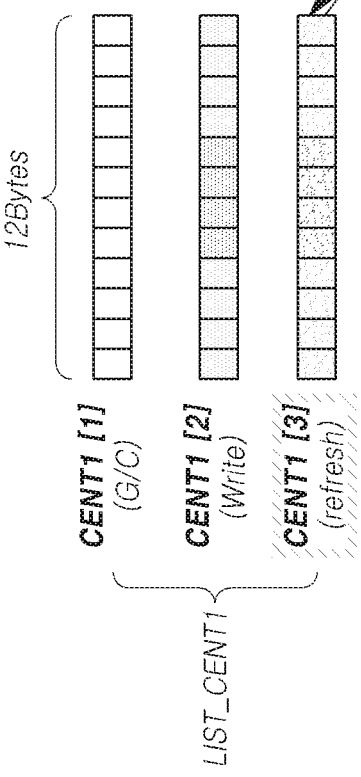

FIG. 26

12Bytes (=96bits)

| | 4Bytes | 4Bytes | 4Bytes | |
|---|---|---|---|---|
| VPT | 0x 01 00 0A 01 | 0x 05 08 00 00 | 0x 0A 0C 00 03 | Hexadecimal |
| | 00000001 00000000 00001010 00000001 | 00000101 00001000 00000000 00000000 | 00001010 00001100 00000000 00000011 | Binary |

⊕

| CT | 0x 01 00 02 00 | 0x 01 08 00 00 | 0x 0A 0C 00 03 | Hexadecimal |
|---|---|---|---|---|
| | 00000001 00000000 00000010 00000000 | 00000001 00001000 00000000 00000000 | 00001010 00001100 00000000 00000011 | Binary |

=

| Updated VPT | 0x 00 00 08 01 | 0x 04 00 00 00 | 0x 00 00 00 00 | Hexadecimal |
|---|---|---|---|---|
| | 00000000 00000000 00001000 00000001 | 00000100 00000000 00000000 00000000 | 00000000 00000000 00000000 00000000 | Binary |

Recently Open Block Index Table (2800)

| 100 | 110 | 105 | 104 | 200 | 220 | 130 |

Use order (write order)

MEMORY SYSTEM, MEMORY CONTROLLER AND METHOD FOR OPERATING MEMORY CONTROLLER

CROSS-REFERENCE TO RELATED APPLICATION

The present application claims priority to Korean Patent Application No. 10-2019-0047013 filed on Apr. 23, 2019, which is incorporated herein by reference in its entirety.

BACKGROUND

1. Technical Field

Various embodiments generally relate to a memory system, a memory controller and a method for operating a memory controller.

2. Related Art

A memory system corresponding to a storage device is a device, which stores data based on a request of a host, such as a computer, a mobile terminal such as a smartphone and a tablet, or various electronic devices. The memory system may include not only a device which stores data in a magnetic disk, such as a hard disk drive (HDD), but also a device which stores data in a nonvolatile memory, such as a solid state drive (SDD), a universal flash storage (UFS) device and an embedded MMC (eMMC) device.

The nonvolatile memory included in the memory system may include a read only memory (ROM), a programmable ROM (PROM), an electrically programmable ROM (EPROM), an electrically erasable and programmable ROM (EEPROM), a flash memory, a phase-change RAM (PRAM), an magnetic RAM (MRAM), an resistive RAM (RRAM), and an ferroelectric RAM (FRAM).

The memory system may further include a memory controller for controlling a memory device. The memory controller may receive a command from the host, and may perform or control an operation for reading, writing or erasing data with respect to a volatile memory or a non-volatile memory included in the memory system, based on the received command.

In the case of the memory system, it is necessary to detect statuses of pages in the memory device and perform related operations based on the detected results. However, in the case of the conventional memory system, the statuses of the pages in the memory device cannot be efficiently and quickly detected.

SUMMARY

Various embodiments are directed to a memory system, a memory controller and a method for operating a memory controller, for efficiently managing statuses of pages in a memory device.

Also, various embodiments are directed to a memory system, a memory controller and a method for operating a memory controller, capable of improving write performance through effective management of page status information.

Further, various embodiments are directed to a memory system, a memory controller and a method for operating a memory controller, capable of cache-based page status information management.

Moreover, various embodiments are directed to a memory system, a memory controller and a method for operating a memory controller, capable of storing and managing page status information in a first memory and storing and managing information necessary to update page status information, in a second memory different from the first memory, for cache-based page status information management.

Embodiments of the disclosure may provide a memory system including: a memory device including a plurality of pages; and a memory controller configured to control a write operation of the memory device.

The memory controller may manage statuses of the respective pages by referring to a first memory and a second memory.

At least one of the first memory and the second memory may be included inside the memory controller.

The first memory may store a valid page table which includes valid page checking information of the respective pages.

The second memory may cache a cache table which includes information for updating a part of the valid page table and has a size smaller than the valid page table.

The memory controller may update the valid page table based on the cache table.

The memory controller may move at least one valid page in any one first block which is checked as having an invalid page therein, to another block different from the first block, by referring to the updated valid page table, and may reset an address for the at least one valid page.

For instance, the first memory may be a dynamic RAM (DRAM), and the second memory may be a static RAM (SRAM).

The plurality of pages may be grouped into a plurality of stripe pages.

The cache table may include one or more first cache entries, and a plurality of second cache entries.

Each of the first cache entries may include new write information of at least two respective pages in a first stripe page among the plurality of stripe pages.

Each of the second cache entries may include invalid page change information of at least two respective pages in a second stripe page among the plurality of stripe pages.

The number of bits corresponding to each of the plurality of stripe pages in the valid page table may be defined by a size corresponding to 1 bit in the valid page table, a page size, a number of dies and a number of planes per die.

The at least two first cache entries may correspond to at least two different operation events, respectively. The at least two first cache entries may be identified by first cache indexes, which indicate the operation events respectively.

The at least two operation events may include at least two among a write operation event, a garbage collection operation event and a refresh operation event.

After an open block is selected, when a specific stripe page for which the operation event is performed is the same as the first stripe page or the first cache entry is empty, the memory controller may perform a cache update operation of updating new write information of at least two respective pages in the first stripe page included in the first cache entry.

After the open block is selected, when the specific stripe page is different from the first stripe page, the memory controller may perform a flush operation of updating the valid page table stored in the first memory based on new write information of at least two respective pages in the first stripe page included in the first cache entry.

After performing the flush operation, the memory controller may perform a cache update operation of updating the first cache entry to allow the first cache entry to include new write information of at least two respective pages in the specific stripe page.

The memory device may include a plurality of memory blocks, and each of the plurality of memory blocks may include a plurality of pages.

The plurality of memory blocks may be grouped into a plurality of super blocks. Each of the plurality of super blocks may include at least two stripe pages.

Each of the second cache entries may be identified by a second cache index which is defined by a combination of a super block index and a stripe page index.

After controlling a write operation of a specific stripe page in a specific super block, the memory controller may calculate a specific second cache index which is defined by a combination of a super block index for the specific super block and a stripe page index for the specific stripe page.

When a second cache entry corresponding to the specific second cache index is empty, the memory controller may perform cache update of updating invalid page change information of at least two respective pages in the specific stripe page, in the second cache entry corresponding to the specific second cache index.

When the second cache entry corresponding to the specific second cache index corresponds to the specific stripe page, the memory controller may perform a cache update of updating invalid page change information of at least two respective pages in the specific stripe page, in the second cache entry corresponding to the specific second cache index.

When the second cache entry corresponding to the specific second cache index does not correspond to the specific stripe page, the memory controller may perform a flush operation of updating the valid page table stored in the first memory, based on invalid page change information included in the second cache entry corresponding to the specific second cache index, and may perform cache update of updating invalid page change information of at least two respective pages in the specific stripe page, in the second cache entry corresponding to the specific second cache index.

The memory controller may perform the flush operation of updating the valid page table stored in the first memory through an exclusive OR (XOR) operation on invalid page change information included in the second cache entry corresponding to the specific second cache index and corresponding valid page checking information included in the valid page table stored in the first memory.

The plurality of second cache entries may correspond to a preset number of recent super blocks, on which a write operation is most recently performed.

The memory controller may directly update, in the valid page table stored in the first memory, valid page checking information of the respective pages in a super block different from the recent super blocks.

Embodiments of the disclosure may provide a memory controller including: a memory interface configured to communicate with a memory device including a plurality of pages; a control circuit configured to control an operation of the memory device; a first memory configured to store a valid page table which includes valid page checking information of the respective pages; and a second memory configured to cache a cache table which includes information for updating a part of the valid page table and has a size smaller than the valid page table.

The control circuit may manage statuses of the respective pages by referring to the first memory and the second memory.

The plurality of pages may be grouped into a plurality of stripe pages.

The cache table may include one or more first cache entries, and a plurality of second cache entries.

Each of the first cache entries may include new write information of at least two respective pages in a first stripe page among the plurality of stripe pages.

Each of the second cache entries may include invalid page change information of at least two respective pages in a second stripe page among the plurality of stripe pages.

Embodiments of the disclosure may provide a method for operating a memory controller for controlling a memory device.

The method for operating a memory controller may include: controlling a write-related operation of the memory device; and updating information stored in one of a first memory and a second memory, to manage statuses of a plurality of pages of the memory device.

The first memory may store a valid page table which includes page status information of the plurality of respective pages.

The second memory may cache a cache table which includes information for updating a part of the valid page table and has a size smaller than the valid page table.

The method for operating a memory controller may further include, after the updating, moving at least one valid page checked as existing in a first block, to a second block, by referring to the updated valid page table, and resetting an address for the at least one valid page.

Embodiments of the disclosure may provide a memory system comprising: a memory device including plural stripe pages each comprising plural unit pages; a first cache configured to cache a first table having plural first entries respectively representing validity of each unit page within the stripe pages; a second cache configured to cache a second table having one or more second entries each representing current data storage into each unit page within a corresponding one among the stripe pages; a third cache configured to cache a third table having plural third entries each representing current invalidation of each unit page within a corresponding one among the stripe pages; and a controller.

The controller may update one or more among the first to third tables according to one or more operations of data storage and invalidation to one or more unit pages within the memory device.

The controller may update the first table according to the update of the second and third tables.

The controller may control the memory device to secure an available memory space thereof based on the first table.

Each of the second and third caches operates faster than the first cache.

The embodiments of the disclosure may provide a memory system, a memory controller and a method for operating a memory controller, for efficiently managing statuses of pages in a memory device.

Also, the embodiments of the disclosure may provide a memory system, a memory controller and a method for operating a memory controller, capable of improving write performance through effective management of page status information.

Further, the embodiments of the disclosure may provide a memory system, a memory controller and a method for operating a memory controller, capable of cache-based page status information management.

Moreover, the embodiments of the disclosure may provide a memory system, a memory controller and a method for operating a memory controller, capable of storing and managing page status information in a first memory and caching and managing information necessary to update page status information, in a second memory different from the first memory, for cache-based page status information management, thereby reducing an access count to the first memory and through this, improving write performance.

BRIEF DESCRIPTION OF THE DRAWINGS

FIG. 15 is a diagram of identification indexes of two respective cache entries of the cache table cached and managed in the second memory for the cache-based page status information management in accordance with the embodiments of the disclosure.

FIGS. 17 to 20 are diagrams of the update of a first cache entry list and the update of a valid page table related therewith, upon cache-based page status information management related with the first cache entry list in accordance with the embodiments of the disclosure.

FIGS. 22 to 26 are diagrams of a second cache entry list and the update of a valid page table related therewith, upon cache-based page status information management related with the second cache entry list in accordance with the embodiments of the disclosure.

DETAILED DESCRIPTION

Figure 1:
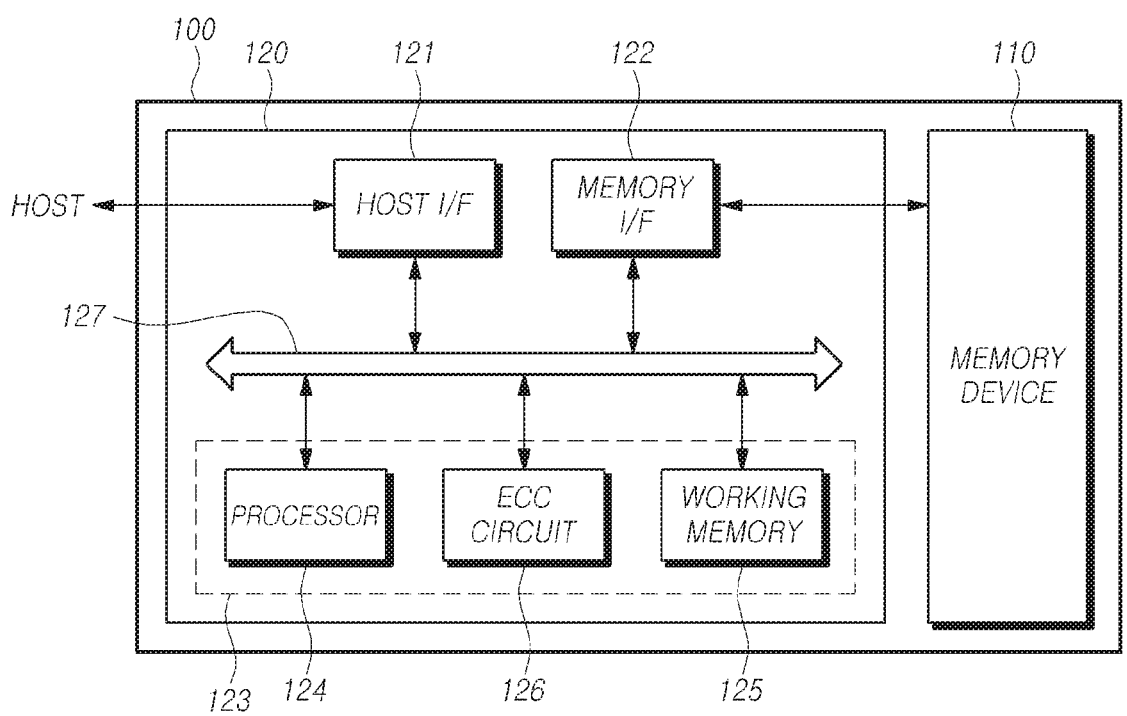
FIG. 1 is a block diagram schematically illustrating a memory system in accordance with embodiments of the disclosure.

Advantages and features of the disclosure and methods to achieve the advantages and features will become apparent from the descriptions of exemplary embodiments herein below with reference to the accompanying drawings. However, the disclosure is not limited to the exemplary embodiments disclosed herein but may be implemented in various different ways. The exemplary embodiments are provided for making the disclosure thorough and for fully conveying the scope of the disclosure to those skilled in the art to which the disclosure pertains. It is to be noted that the scope of the disclosure is defined only by the claims.

The figures, dimensions, ratios, angles, numbers of elements given in the drawings to describe embodiments of the disclosure are merely illustrative and are not limiting. Throughout the specification, like reference numerals refer to like elements. In describing the disclosure, when it is determined that the detailed description of the known related art may obscure the gist of the disclosure, the detailed description thereof will be omitted. It is to be noticed that the terms "comprising," "having," "including" and so on, used in the description and claims, should not be interpreted as being restricted to the means listed thereafter unless specifically stated otherwise. Where an indefinite or definite article is used when referring to a singular noun, e.g. "a," "an," "the," this may include a plural of that noun unless specifically stated otherwise.

In interpreting elements in embodiments of the disclosure, the elements should be interpreted as including error margins even without explicit statements.

Also, in describing the components of the disclosure, there may be terms used like first, second, A, B, (a), and (b). These are solely for the purpose of differentiating one component from the other and do not imply or suggest the substances, order, sequence or number of the components. If a component is described as "connected," "coupled" or "linked" to another component, it may mean that the component is not only directly "connected," "coupled" or "linked" but also is indirectly "connected," "coupled" or "linked" via a third component. In describing a positional relationship, such as "an element A on an element B," "an element A above an element B," "an element A below an element B" and "an element A next to an element B," another element C may be disposed between the elements A and B unless the term "directly" or "immediately" is explicitly used.

Also, elements in embodiments of the disclosure are not limited by these terms. These terms are used to merely distinguish one element from another. Accordingly, as used herein, a first element may be a second element within the technical idea of the disclosure.

Features of various exemplary embodiments of the disclosure may be coupled, combined or separated partially or totally. Technically various interactions and operations are possible. Various exemplary embodiments can be practiced individually or in combination.

Hereinafter, a memory system, a memory controller and a method for operating a memory controller will be described below in detail with reference to the accompanying drawings through various examples of embodiments of the disclosure.

FIG. 1 is a block diagram schematically illustrating a memory system 100 in accordance with embodiments of the disclosure.

Referring to FIG. 1, the memory system 100 in accordance with the embodiments of the disclosure may include a memory device 110 which stores data, and a memory controller 120 which controls the memory device 110.

The memory device 110 includes a plurality of memory blocks and operates in response to the control of the memory controller 120. Operations of the memory device 110 may include, for example, a read operation, a program operation (also referred to as a write operation), and an erase operation.

The memory device 110 may include a memory cell array including a plurality of memory cells which store data. Such a memory cell array may exist in a memory block.

For example, the memory device 110 may be realized by a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a vertical NAND flash memory, a NOR flash memory, a resistive random access memory (RRAM), a phase-change memory (PRAM/PCRAM), a magneto-resistive random access memory (MRAM), a ferroelectric random access memory (FRAM) or a spin transfer torque random access memory (STT-RAM).

The memory device 110 may be realized in a three-dimensional array structure. The embodiments of the disclosure may be applied to not only a flash memory device in which a charge storage layer is configured by a conductive floating gate but also a charge trap flash (CTF) in which a charge storage layer is configured by a dielectric layer.

The memory device 110 is configured to receive a command and an address from the memory controller 120, and access a region in the memory cell array which is selected by the address. That is, the memory device 110 may perform an operation corresponding to the command, for a region selected by the address.

For example, the memory device 110 may perform a program operation, a read operation, and an erase operation. In the program operation, the memory device 110 may program data in a region selected by the address. In the read operation, the memory device 110 may read data from a region selected by the address. In the erase operation, the memory device 110 may erase data stored in a region selected by the address.

The memory controller 120 may control the operation of the memory device 110 according to a request of a host or regardless of a request of the host.

For example, the memory controller 120 may control write (program), read, erase and background operations for the memory device 110. For example, the background operation may be a garbage collection (GC) operation, a wear leveling (WL) operation, a bad block management (BBM) operation, or the like.

Referring to FIG. 1, the memory controller 120 may include a host interface 121, a memory interface 122, and a control circuit 123.

The host interface 121 provides an interface for communication with the host. When receiving a command from the host, the control circuit 123 may receive the command through the host interface 121, and then, may perform an operation of processing the received command.

The memory interface 122 is coupled with the memory device 110 and thereby provides an interface for communication with the memory device 110. That is, the memory interface 122 may be configured to provide the interface between the memory device 110 and the memory controller 120 in response to the control of the control circuit 123.

The control circuit 123 performs the general control operations of the memory controller 120, thereby controlling the operations of the memory device 110. To this end, for instance, the control circuit 123 may include at least one of a processor 124 and a working memory 125, and as the case may be, may further include an error detection and correction circuit (ECC circuit) 126.

The processor 124 may control general operations of the memory controller 120, and may perform a logic calculation. The processor 124 may communicate with the host through the host interface 121, and may communicate with the memory device 110 through the memory interface 122.

The processor 124 may perform the function of a flash translation layer (FTL). The processor 124 may translate a logical block address (LBA) provided by the host, into a physical block address (PBA), through the flash translation layer (FTL). The flash translation layer (FTL) may receive the logical block address (LBA) and translate it into the physical block address (PBA), by using a mapping table. There are various address mapping methods of the flash translation layer, depending on a mapping unit. Representative address mapping methods include a page mapping method, a block mapping method and a hybrid mapping method.

The processor 124 is configured to randomize data received from the host. For example, the processor 124 may randomize data received from the host, by using a randomizing seed. Randomized data as data to be stored is provided to the memory device 110 and is programmed to the memory cell array.

The processor 124 is configured to derandomize data received from the memory device 110, in a read operation. For example, the processor 124 may derandomize data received from the memory device 110, by using a derandomizing seed. Derandomized data may be outputted to the host.

The processor 124 may control the operation of the memory controller 120 by executing firmware. In order to control general operations of the memory controller 120 and perform a logic calculation, the processor 124 may execute (drive) firmware loaded to the working memory 125 upon booting. For instance, the firmware may be stored in the memory device 110 and be loaded to the working memory 125.

The firmware as a program executed in the memory system 100 may include, for example, a flash translation layer (FTL) which performs a translation function between a logical address requested to the memory system 100 from the host and a physical address of the memory device 110, a host interface layer (HIL) which serves to analyze a command requested to the memory system 100 as a storage device from the host and transfers the command to the flash translation layer (FTL), and a flash interface layer (FIL) which transfers a command instructed from the flash translation layer (FTL) to the memory device 110.

The working memory 125 may store a firmware, a program code, a command and data which are necessary to drive the memory controller 120.

The working memory 125, for example, as a volatile memory, may include at least one among a static RAM (SRAM), a dynamic RAM (DRAM) and a synchronous DRAM (SDRAM).

The error detection and correction circuit 126 may be configured to detect an error bit of data stored in the working memory 125 (that is, read data transferred from the memory device 110) by using an error correction code and correct the detected error bit.

The error detection and correction circuit 126 may decode data by using an error correction code. The error detection and correction circuit 126 may include various code decoders. For example, a decoder which performs unsystematic code decoding or a decoder which performs systematic code decoding may be used.

For example, the error detection and correction circuit 126 may detect an error bit for each read data, in the unit of sector. Namely, each read data may be constituted by a plurality of sectors. A sector may mean a data unit smaller than a page as a read unit of a flash memory. Sectors constituting each read data may be matched with one another by using the medium of an address.

The error detection and correction circuit 126 may calculate a bit error rate (BER), and may determine whether an error is correctable or not, in the unit of sector. For example, when a bit error rate (BER) is higher than a reference value, the error detection and correction circuit 126 may determine a corresponding sector as being uncorrectable or a fail. When a bit error rate (BER) is lower than the reference value, the error detection and correction circuit 126 may determine that a corresponding sector is correctable or a pass.

The error detection and correction circuit 126 may perform an error detection and correction operation sequentially for all read data. When a sector included in read data is correctable, the error detection and correction circuit 126 may omit an error detection and correction operation for a corresponding sector for next read data. If the error detection and correction operation for all read data is ended in this way, the error detection and correction circuit 126 may detect a sector which is determined to be uncorrectable to the last. There may be one or more sectors that are determined to be uncorrectable. The error detection and correction circuit 126 may transfer an information (for example, an address information) on a sector which is determined to be uncorrectable, to the processor 124.

A bus 127 may be configured to provide channels among the components 121, 122, 124, 125 and 126 of the memory controller 120. The bus 127 may include, for example, a control bus for transferring various control signals, commands and the like, a data bus for transferring various data, and so forth.

The above-described components 121, 122, 124, 125 and 126 of the memory controller 120 are for an illustration purpose only. Some of the mentioned components 121, 122, 124, 125 and 126 may be omitted, some of the mentioned components 121, 122, 124, 125 and 126 may be combined into one, or at least one component may be added.

Hereinbelow, the memory device 110 will be described in further detail with reference to FIG. 2.

Figure 2:
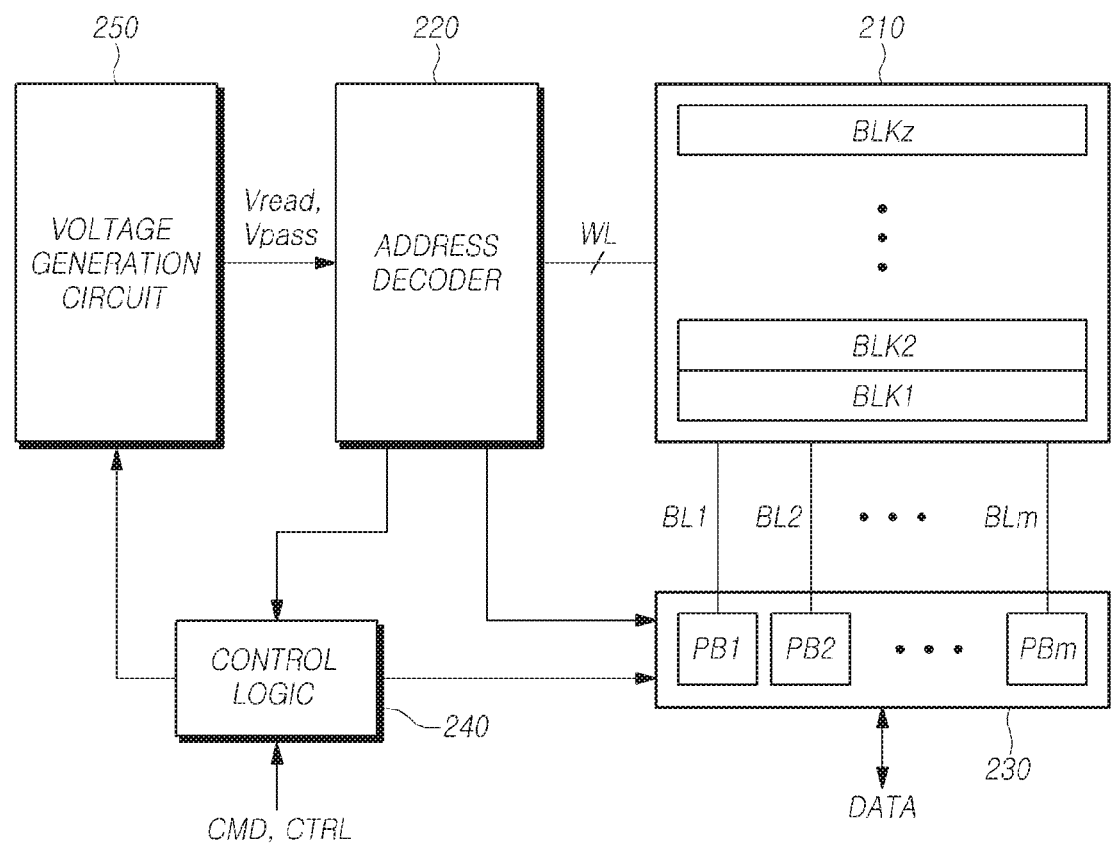
FIG. 2 is a block diagram schematically illustrating a memory device in accordance with the embodiments of the disclosure.

FIG. 2 is a block diagram schematically illustrating a memory device 110 in accordance with the embodiments of the disclosure.

Referring to FIG. 2, the memory device 110 in accordance with the embodiments may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled to the address decoder 220 through the plurality of word lines WL. The plurality of memory blocks BLK1 to BLKz may be coupled to the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells which have vertical channel structures. The memory cell array 210 may be configured by a memory cell array of a two-dimensional structure, or as the case may be, may be configured by a memory cell array of a three-dimensional structure.

Each of the plurality of memory cells included in the memory cell array may store at least 1-bit data. For instance, each of the plurality of memory cells included in the memory cell array 210 may be a single level cell (SLC) storing 1-bit data. For another instance, each of the plurality of memory cells included in the memory cell array 210 may be a multi-level cell (MLC) which stores 2-bit data. For still another instance, each of the plurality of memory cells included in the memory cell array 210 may be a triple level cell (TLC) which stores 3-bit data. For yet another instance, each of the plurality of memory cells included in the memory cell array 210 may be a quad level cell (QLC) which stores 4-bit data. For still yet another instance, the memory cell array 210 may include a plurality of memory cells each of which stores 5 or more-bit data.

Referring to FIG. 2, the address decoder 220, the read and write circuit 230, the control logic 240 and the voltage generation circuit 250 may operate as peripheral circuits which drive the memory cell array 210.

The address decoder 220 may be coupled to the memory cell array 210 through the plurality of word lines WL. The address decoder 220 may be configured to operate in response to the control of the control logic 240. The address decoder 220 may receive an address through an input/output buffer in the memory device 110.

The address decoder 220 may be configured to decode a block address in the received address. The address decoder 220 may select at least one memory block depending on the decoded block address. The address decoder 220 may apply a read voltage Vread generated in the voltage generation circuit 250 to a word line selected in a memory block selected in a read voltage applying operation during a read operation, and may apply a pass voltage Vpass to the remaining unselected word lines. Further, the address decoder 220 may apply a verify voltage generated in the voltage generation circuit 250 to a word line selected in a selected memory block in a program verify operation, and may apply the pass voltage Vpass to the remaining unselected word lines.

The address decoder 220 may be configured to decode a column address in the received address. The address decoder 220 may transmit the decoded column address to the read and write circuit 230.

A read operation and a program operation of the memory device 110 may be performed in the unit of page. An address received when a read operation or a program operation is requested may include a block address, a row address and a column address.

The address decoder 220 may select one memory block and one word line depending on a block address and a row address. A column address may be decoded by the address decoder 220 and be provided to the read and write circuit 230.

The address decoder 220 may include at least one among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may include a page buffer circuit or a data register circuit. For example, the data register circuit may include a data buffer for performing a data processing function, and may further include a cache buffer for performing a caching function.

The plurality of page buffers PB may be coupled to the memory cell array 210 through the plurality of bit lines BL. The plurality of page buffers PB may continuously supply sensing current to bit lines coupled with memory cells to sense the threshold voltages (Vth) of the memory cells in a read operation and a program verify operation, and may latch sensing data by sensing, through sensing nodes, that the amounts of current flowing are changed depending on the programmed states of the corresponding memory cells. The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory device 110. As an exemplary embodiment, the read and write circuit 230 may include a column select circuit in addition to the page buffers (or page registers).

The control logic 240 may be coupled with the address decoder 220, the read and write circuit 230 and the voltage generation circuit 250. The control logic 240 may receive a command CMD and a control signal CTRL through the input/output buffer of the memory device 110.

The control logic 240 may be configured to control general operations of the memory device 110 in response to the control signal CTRL. Further, the control logic 240 may output a control signal for adjusting the precharge potential levels of the sensing nodes of the plurality of page buffers PB.

The control logic 240 may control the read and write circuit 230 to perform a read operation of the memory cell array 210.

The voltage generation circuit 250 may generate the read voltage Vread and the pass voltage Vpass in a read operation in response to a voltage generation circuit control signal outputted from the control logic 240.

Figure 3:
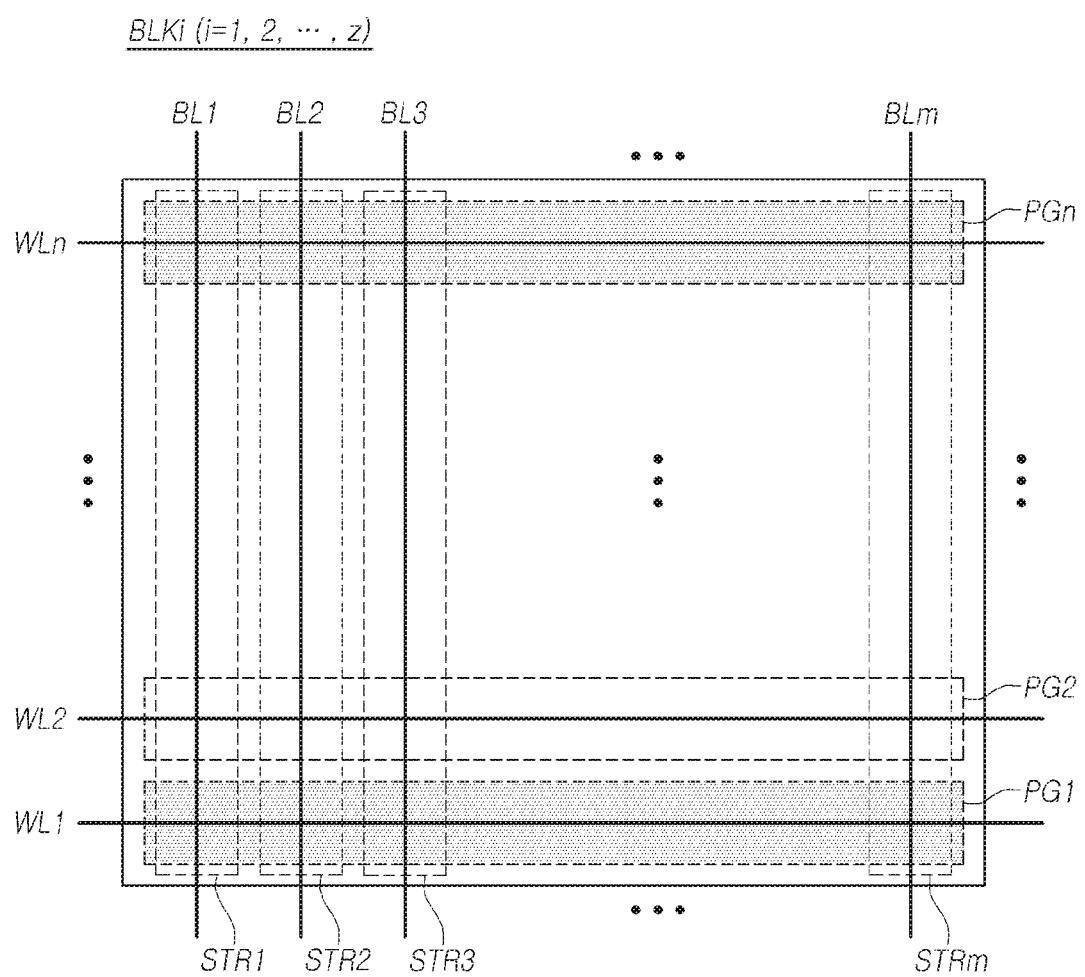
FIG. 3 is a diagram schematically illustrating a memory block of the memory device in accordance with the embodiments of the disclosure.

FIG. 3 is a diagram schematically illustrating one of the plurality of memory blocks BLK1 to BLKz of the memory device 110 in accordance with the embodiments of the disclosure.

Referring to FIG. 3, each of the plurality of memory blocks BLK1 to BLKz included in the memory device 110 may be configured as a plurality of pages PG and a plurality of strings STR, which are disposed in the form of a matrix.

The plurality of pages PG correspond to a plurality of word lines WL, and the plurality of strings STR correspond to a plurality of bit lines BL.

That is, in each of the plurality of memory blocks BLK1 to BLKz, the plurality of word lines WL and the plurality of bit lines BL may be disposed to intersect each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

As the plurality of word lines WL and the plurality of bit lines BL intersect with each other, a plurality of memory cells MC may be defined. A transistor may be disposed in each memory cell MC. For example, the transistor disposed in each memory cell MC may include a drain, a source and a gate. The drain (or the source) of the transistor may be coupled directly or via one or more other transistors with a corresponding bit line, the source (or the drain) of the transistor may be coupled directly or via one or more other transistors with a source line (which may be the ground), and the gate of the transistor may include a floating gate which is surrounded by a dielectric and a control gate to which a gate voltage is applied.

A read operation and a program operation (write operation) may be performed in the unit of page, and an erase operation may be performed in the unit of memory block.

Referring to FIG. 3, in each of the plurality of memory blocks BLK1 to BLKz, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

The memory system 100 in accordance with the embodiments of the disclosure may detect statuses (e.g., valid statuses, invalid statuses or the likes) of a plurality of pages PG in the memory device 110, and by using the detected statuses, may perform various operations related with the statuses of the pages PG. This will be described below in detail.

Figure 4:
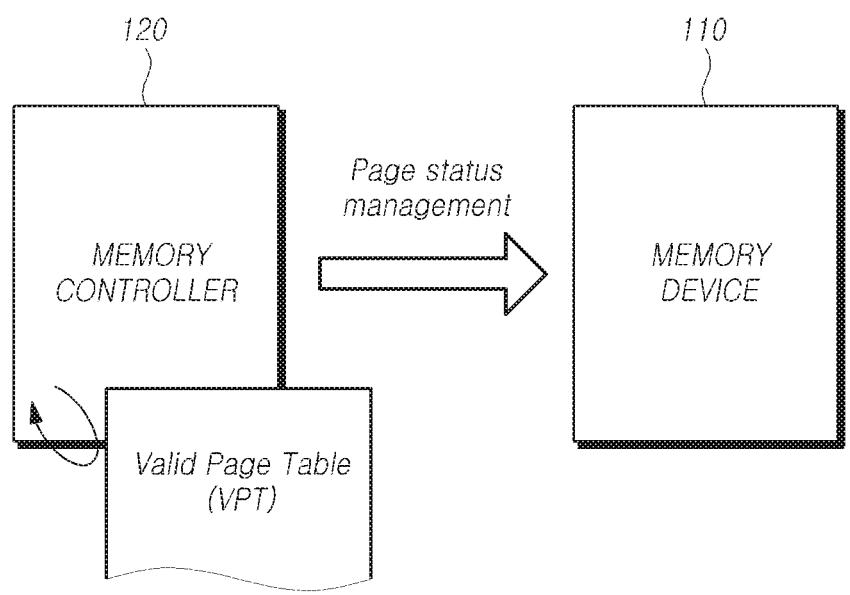
FIG. 4 is a diagram illustrating a page status information management method in accordance with embodiments of the disclosure.

FIG. 4 is a diagram illustrating a page status information management method in accordance with embodiments of the disclosure.

Referring to FIG. 4, the memory controller 120 may detect statuses (e.g., valid statuses, invalid statuses or the like) of a plurality of pages PG in the memory device 110, and by using the detected statuses, may perform various operations related with page statuses.

The memory controller 120 may refer to a valid page table (VPT) to detect (check) statuses (e.g., valid statuses, invalid statuses or the like) of the respective pages PG in the memory device 110.

The VPT may include valid page checking information indicating whether each of the plurality of pages PG is a valid page. The valid page checking information is information indicating page statuses may also be referred to as page status information.

For example, if the valid page checking information is 1, a corresponding page PG may be a valid page, and if the valid page checking information is 0, a corresponding page PG may be an invalid page.

The VPT may include valid page checking information for all pages PG. For example, if the valid page checking information is 1 for each of all the pages PG, a corresponding page PG may be a valid page, and if the valid page checking information is 0 for each of all the pages PG, a corresponding page PG may be an invalid page.

For another instance, the VPT may include valid page checking information for only some pages PG among all pages PG. In this case, valid page checking information each indicating a valid page or an invalid page may be included for only some pages PG each of which is a valid page or an invalid page.

As the various operations related with page statuses, any operations in each of which appropriate processing is performed depending on the page statuses may be possible.

For example, the various operations related with page statuses may include a block management operation such as garbage collection and bad block management, and a memory management operation for increasing a valid storage space in the memory device 110.

In the present specification, page status management may mean "page status information management" for detecting a status of each page PG and storing and updating a status information, and may include performing various related operations based on page status information processed through such page status information management.

Figure 5:
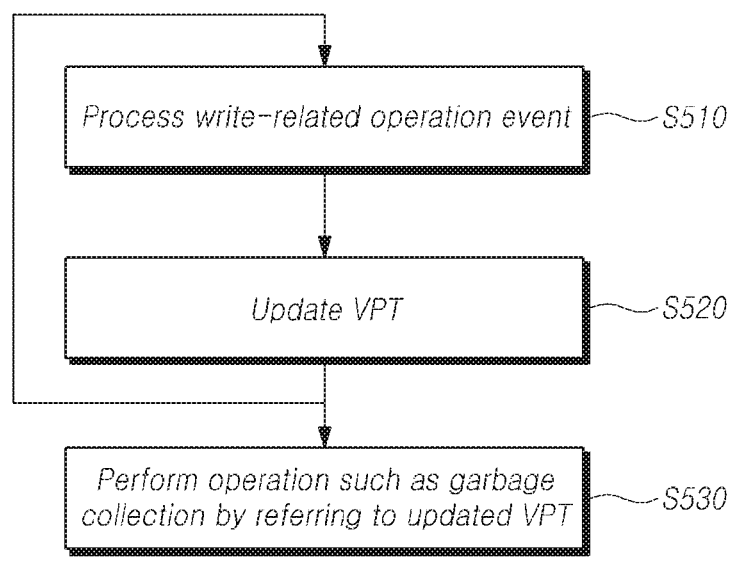
FIG. 5 is of a flow chart of the progress of a related operation utilizing page status information in accordance with the embodiments of the disclosure.

FIG. 5 is a flow chart of the progress of a related operation utilizing page status information in accordance with the embodiments of the disclosure.

Referring to FIG. 5, a related operation processing method (a page status management method) utilizing page status information in accordance with the embodiments of the disclosure may include step S510 in which the memory controller 120 processes a write-related operation event and thereby controls a write-related operation in the memory device 110, and step S520 in which the memory controller 120 updates the VPT when the write-related operation is performed as the memory controller 120 processes the write-related operation event.

The memory controller 120 may update the VPT each time a write-related operation is performed, or may not update the VPT each time a write-related operation is performed but may update the VPT when some write-related operations are performed.

Referring to FIG. 5, the related operation processing method (the page status management method) utilizing page status information in accordance with the embodiments of the disclosure may further include step S530 in which the memory controller 120 performs a related operation such as garbage collection, by referring to the updated VPT.

The VPT includes valid page checking information indicating page statuses in the unit of logical page. Such a VPT may be implemented as a type of a bitmap.

The size of the VPT may be large. Due to this fact, the VPT may be stored in a DRAM. The DRAM may exist inside the memory controller 120, or may exist outside the memory controller 120. When the DRAM exists inside the memory controller 120, the DRAM may be the working memory 125 or may be one of at least two memories included in the working memory 125.

Furthermore, a data unit used when reading and writing data from and to the DRAM and a unit of a portion of data which is changed in the data stored in the DRAM may be different from each other. For example, while data may be read and written from and to the DRAM in the unit of 1 or 2 bytes, a portion of data to be changed in data stored in the DRAM may be a bit unit. Therefore, in order to update the VPT stored in the DRAM, a read modify write (RMW) operation is required.

Thus, when updating the VPT stored in the DRAM, an RMW operation of the DRAM needs to be performed, and a process latency may be caused each time the RMW operation of the DRAM is performed.

Such a latency caused by the RMW operation of the DRAM may slow down an update speed of the VPT, and eventually, may become a main factor that degrades the performance of page status management. The more frequently the update of the VPT is performed, that is, the more that the DRAM is frequently accessed, the latency caused by the RMW operation of the DRAM and accompanying problems (reduction in update speed, degradation in page status management performance, etc.) may become more serious.

In this consideration, the embodiments of the disclosure may provide a cache-based page status information management method capable of effectively storing a large size VPT, reducing access to the memory space in which the large size VPT is stored, and normally and quickly performing the update of the VPT, thereby allowing page status management utilizing the VPT to be more effectively performed.

Figure 6:
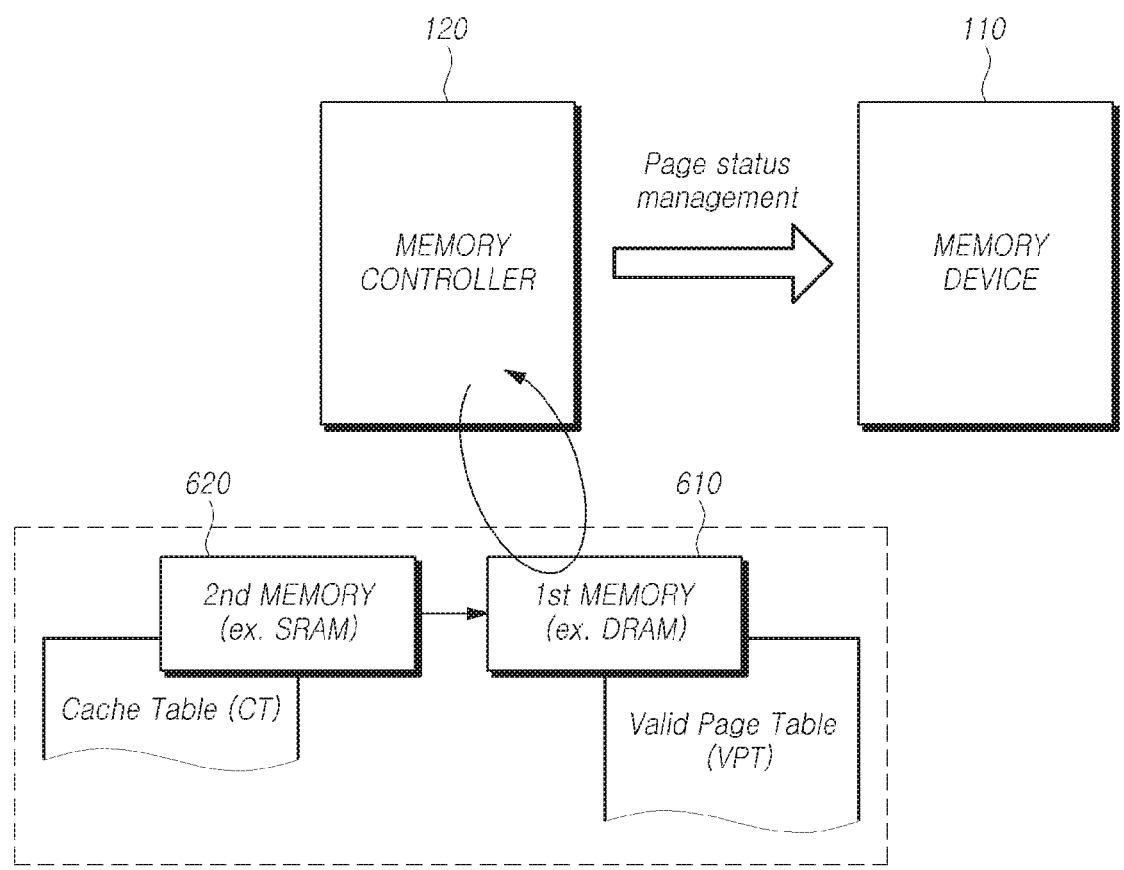
FIG. 6 is a diagram illustrating cache-based page status information management method in accordance with embodiments of the disclosure.

FIG. 6 is a diagram illustrating a cache-based page status information management method in accordance with embodiments of the disclosure.

Referring to FIG. 6, the memory system 100 in accordance with the embodiments of the disclosure may include the memory device 110 which includes a plurality of pages PG and the memory controller 120 which controls a write operation of the memory device 110, for cache-based page status information management.

The memory controller 120 may manage statuses of the respective pages PG of the memory device 110 by referring to a first memory 610 and a second memory 620.

The first memory 610 may store the VPT which includes valid page checking information of the respective pages PG. The valid page checking information may also be referred to as page status information.

The second memory 620 may cache a cache table (CT) which includes information for updating a part of the VPT.

The CT may have a smaller size than the VPT. That is, the CT may include a smaller amount of information than the VPT.

At least one of the first memory 610 and the second memory 620 may be included inside the memory controller 120. For instance, one of the first memory 610 and the second memory 620 may be included in the working memory 125 which is disposed in the memory controller 120. For another instance, both the first memory 610 and the second memory 620 may be included in the working memory 125 which is disposed in the memory controller 120.

The first memory 610 in which the VPT is stored may be a DRAM, and the second memory 620 in which the CT is cached may be a static RAM (SRAM) which is capable of faster input/output than the DRAM.

As described above, the control circuit 123 of the memory controller 120 may manage statuses of the respective pages PG of the memory device 110 by referring to the first memory 610 and the second memory 620.

In more detail, the memory controller 120 may cache the CT in the second memory 620 or update the CT cached in the second memory 620, and depending on a result thereof, may update the VPT and perform a related operation such as garbage collection by referring to the updated VPT.

The memory controller 120 may not need to access the first memory 610 at each operation event and thereby update the VPT at each time. The operation event may be an operation event which requires the update of the VPT. For example, the operation event may be a write-related operation event, and may be a write operation event, a garbage collection operation event or a refresh operation event. A refresh operation may refer to an operation of writing data stored in the memory device 110 to another area of the memory device 110.

Instead of performing access to the first memory 610 and the update of the VPT at each operation event, the memory controller 120 may cache and update information necessary to update the VPT in the CT, and may limitedly perform access to the first memory 610 and the update of the VPT, only in case of need, in relation with the caching and update of the CT.

Thus, access to the first memory 610 and the update, through the access, of the VPT may occur less frequently than access to the second memory 620 and the update, through the access, of the CT.

According to the above-described page status information management method, the large size VPT may be stored in the first memory 610, access to the first memory 610 in which the large size VPT is stored may be reduced, and, by utilizing the CT, the update of the VPT may be quickly and precisely performed at a less frequent count. Therefore, page status management utilizing the VPT may be performed more effectively and more quickly.

Figure 7:
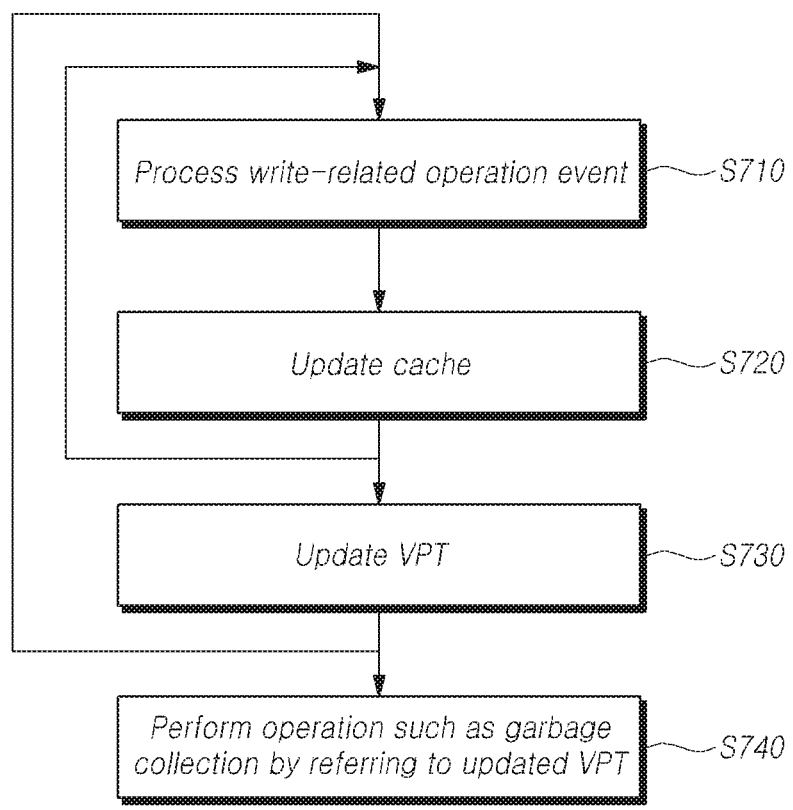
FIG. 7 is a flow chart of the progress of a related operation utilizing cache-based page status information in accordance with the embodiments of the disclosure.

FIG. 7 is a flow chart of the progress of a related operation utilizing cache-based page status information in accordance with the embodiments of the disclosure.

Referring to FIG. 7, in the related operation processing method utilizing cache-based page status information (that is, the page status management method utilizing cache-based page status information) in accordance with the embodiments of the disclosure, main page status information management is implemented after step S710 in which the memory controller 120 controls a write-related operation in the memory device 110 by processing a write-related operation event.

After the memory controller 120 performs the write-related operation, in order to manage statuses of the respective pages PG of the memory device 110, the memory controller 120 may update information (information in the VPT or information in the CT stored in one of the first memory 610 and the second memory 620 as memory components different from the memory device 110.

In more detail, referring to FIG. 7, after the step S710, that is, after the memory controller 120 performs the write-related operation, the related operation processing method utilizing cache-based page status information (that is, the page status management method utilizing cache-based page status information) in accordance with the embodiments of the disclosure may include step 720 in which the update (that may include a caching operation) of the CT is performed, and step S730 in which, immediately or at a required time after the CT is updated, the memory controller 120 updates the VPT.

The update of the VPT may be performed based on the CT already cached before the update, or may be performed in liaison with an update operation of the CT. In the present specification, the update of the VPT is also referred to as a flush operation.

Referring to FIG. 7, the related operation processing method utilizing cache-based page status information (that is, the page status management method utilizing cache-based page status information) in accordance with the embodiments of the disclosure may further include, after the step S730, step S740 in which the memory controller 120 performs a related operation such as garbage collection, by referring to the updated VPT.

In the case where garbage collection is performed as the related operation at the step S740, the memory controller 120 may move (or copy) at least one valid page in a first block which is checked as having an invalid page existing therein, to a block (which may be a good block or an empty block) different from the first block, by referring to the updated VPT, may reset an address for the at least one valid page, and may collect invalid pages in the first block.

Each of the first block and the block different from the first block may be one memory block BLK, may be a group of at least two memory blocks BLK, may not precisely correspond to one or more memory blocks BLK, may be a group of at least two pages PG, and may be various storage spaces.

Before the garbage collection, the first block may include only invalid pages or may include both valid and invalid pages. When the first block includes both valid and invalid pages before the garbage collection is performed, as the garbage collection is performed, the first block may include only invalid pages without a valid page moved to another block, or may include a valid page copied to another block as it is, together with invalid pages.

The block different from the first block includes only valid pages according to the garbage collection. The block different from the first block may be a good block and an empty block.

When performing the garbage collection, the memory controller 120 may erase all data in the first block including invalid pages. Then, the memory controller 120 may reuse the first block as a normal block (also referred to as a good block). According to this fact, the usability of a block may be improved.

Figure 8:
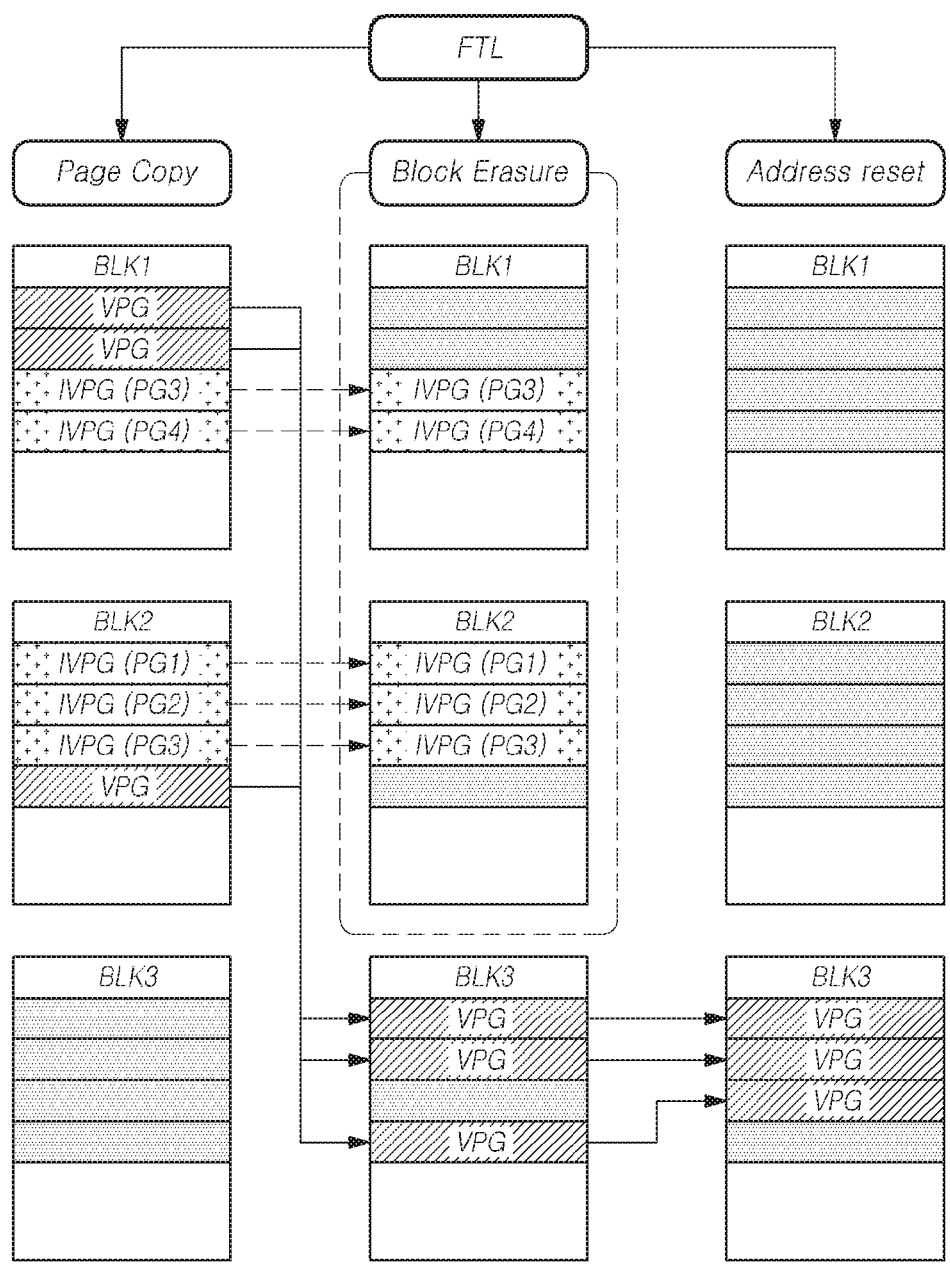
FIG. 8 is a diagram illustrating a related operation utilizing page status information in accordance with the embodiments of the disclosure.

FIG. 8 is a diagram illustrating a related operation utilizing page status information in accordance with the embodiments of the disclosure. FIG. 8 is a diagram conceptually illustrating garbage collection as an illustration of a related operation utilizing page status information.

Referring to FIG. 8, the memory controller 120 may detect a page status (e.g., a valid page status, an invalid page status, or the like) for each of a plurality of pages PG included in each of a plurality of memory blocks BLK in the memory device 110, by referring to the updated VPT.

The VPT may include page status information (a valid page checking information) for each of the plurality of pages PG such that the memory controller 120 may detect a page status (e.g., a valid page status, an invalid page status, or the like) for each of the plurality of pages PG.

For example, the memory controller 120 may distinguishably detect valid pages VPG and invalid pages IVPG among the plurality of pages PG included in each of the plurality of memory blocks BLK in the memory device 110, based on page status information (a valid page checking information) for each of the plurality of pages PG included in each of the plurality of memory blocks BLK included in the updated VPT.

According to the illustration of FIG. 8, as a result of checking page statuses by referring to the VPT, a first memory block BLK1 includes two valid pages VPG and two invalid pages IVPG. A second memory block BLK2 includes one valid page VPG and three invalid pages IVPG.

The memory controller 120 moves (or copies) the two valid pages VPG checked in the first memory block BLK1 to a third memory block BLK3, and moves (or copies) the one valid page VPG checked in the second memory block BLK2 to the third memory block BLK3. According to this fact, the third memory block BLK3 may include only three valid pages VPG with no invalid page.

With respect to a status of the first memory block BLK1 after the above-described processing, the first memory block BLK1 may include the two invalid pages IVPG corresponding to third and fourth pages PG3 and PG4, but may include the two valid pages VPG copied to the third memory block BLK3 as they are, according to a page copy processing scheme, or may not include the two valid pages VPG moved to the third memory block BLK3, according to a page move processing scheme.

With respect to a status of the second memory block BLK2 after the above-described processing, the second memory block BLK2 may include the three invalid pages IVPG corresponding to first to third pages PG1, PG2 and PG3, but may include the one valid page VPG copied to the third memory block BLK3 as it is, according to the page copy processing scheme, or may not include the one valid page VPG moved to the third memory block BLK3, according to the page move processing scheme.

After the above-described processing, the memory controller 120 may perform block erasure processing for the first memory block BLK1 which includes the two invalid pages IVPG corresponding to the third and fourth pages PG3 and PG4 and the second memory block BLK2 which includes the three invalid pages IVPG corresponding to the first to third pages PG1, PG2 and PG3.

Thereafter, the memory controller 120 may perform address reset processing of resetting addresses for the three valid pages VPG moved to the third memory block BLK3. Due to this fact, the memory controller 120 may normally perform address mapping for the three valid pages VPG moved to the third memory block BLK3.

The garbage collection described above may be performed by the processor 124 or the like in the control circuit 123, and may be performed by the flash translation layer (FTL) in terms of a functional layer.

Hereinbelow, the cache-based page status information management method described above will be described in further detail based on an illustration of a structure of a memory device.

Figure 9:
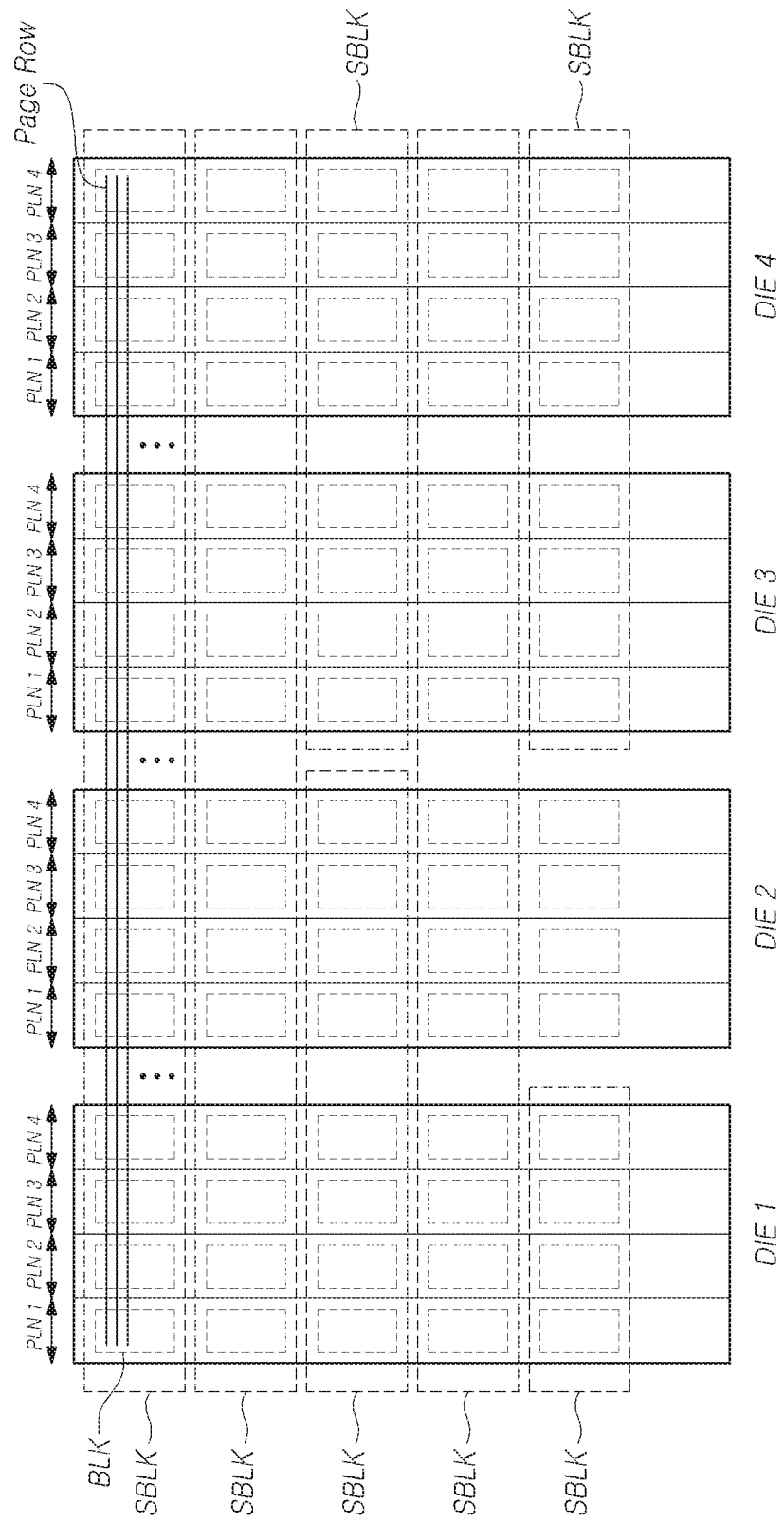
FIG. 9 is a diagram illustrating a structure of a memory device for cache-based page status information management in accordance with the embodiments of the disclosure.

FIG. 9 is a diagram illustrating a structure of a memory device for cache-based page status information management in accordance with the embodiments of the disclosure.

The memory device 110 may include one die, or may include at least two dies. The illustration of FIG. 9 corresponds to a case where the memory device 110 includes four dies DIE 1, DIE 2, DIE 3 and DIE 4.

Each of the four dies DIE 1, DIE 2, DIE 3 and DIE 4 may include one plane, or may include at least two planes. The illustration of FIG. 9 corresponds to a case where each of the four dies DIE 1, DIE 2, DIE 3 and DIE 4 includes four planes PLN 1, PLN 2, PLN 3 and PLN 4.

The memory device 110 may include a plurality of memory blocks BLK. Further, as illustrated in FIG. 3, each of the plurality of memory blocks BLK may include a plurality of pages PG.

According to the illustration of FIG. 9, in each of the four dies DIE 1, DIE 2, DIE 3 and DIE 4 of the memory device 110, each of the four planes PLN 1, PLN 2, PLN 3 and PLN 4 may include a plurality of memory blocks BLK. Further, as illustrated in FIG. 3, in each of the four planes PLN 1, PLN 2, PLN 3 and PLN 4, each of the plurality of memory blocks BLK may include a plurality of pages PG.

Referring to FIG. 9, a plurality of memory blocks BLK may be grouped into a plurality of super blocks SBLK. One super block SBLK may be a set of memory blocks BLK for which a read operation and/or a write operation is performed simultaneously or during the same time period or a read operation and/or a write operation is performed by being linked or related, may be a set of memory blocks BLK for which a read operation and/or a write operation is performed in response to one command, or may be a set of memory blocks BLK for which a read operation and/or a write operation is performed by being linked or simultaneously in the memory device 110. In addition, among a plurality of memory blocks BLK, a group of memory blocks BLK which are distinguished in terms of operation may be defined as a super block SBLK.

The sizes of the respective super blocks SBLK may be all the same, or at least one of the plurality of super blocks SBLK may be different in size from the other super blocks SBLK. In other words, the numbers of memory blocks BLK included in the respective super blocks SBLK may be all the same, or the number of memory blocks BLK included in at least one super block SBLK among the plurality of super blocks SBLK may be different from the numbers of memory blocks BLK included in the other super blocks SBLK.

Additionally, all of at least two memory blocks BLK which are included in each of the plurality of super blocks SBLK may be positioned in the same one die. Unlike this, at least two memory blocks BLK which are included in each of the plurality of super blocks SBLK may be positioned in at least two dies which are different from each other.

Each of a plurality of memory blocks BLK which are included in one super block SBLK includes a plurality of pages PG, and the plurality of pages PG may configure a plurality of page rows depending on a row order. One page row is configured by a plurality of pages. One page row may exist in each die, or may exist in each plane in each die. In the present specification, a page PG may correspond to a word line WL.

Figure 10:
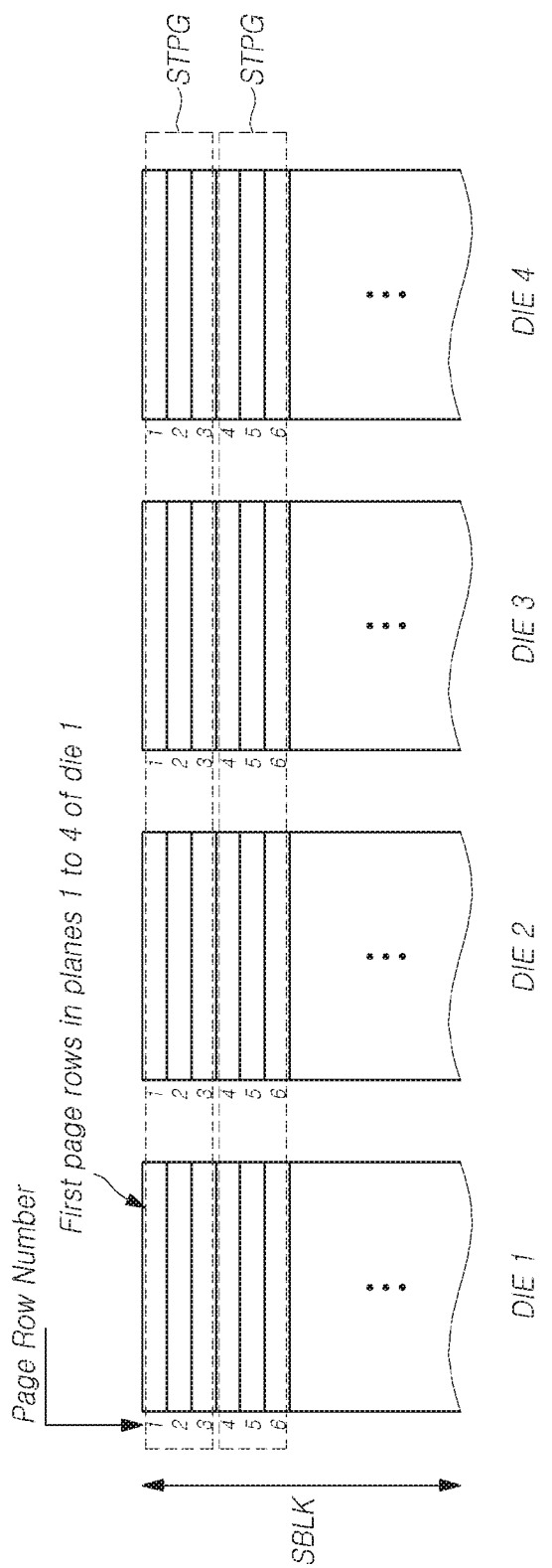
FIG. 10 is a diagram illustrating a cache unit for the cache-based page status information management in accordance with the embodiments of the disclosure.

FIG. 10 is a diagram illustrating a cache unit for the cache-based page status information management in accordance with the embodiments of the disclosure.

Referring to FIG. 10, the cache-based page status information management in accordance with the embodiments of the disclosure is implemented in the unit of a stripe page STPG as a logical page having a page group concept, in one super block SBLK.

Each of the plurality of super blocks SBLK may include at least two stripe pages STPG.

One stripe page STPG exists over the plurality of dies DIE 1 to DIE 4, and includes a plurality of pages PG.

Stated otherwise, one stripe page STPG may include a plurality of page rows each as a set of pages PG which are disposed in the same row order over the plurality of dies DIE 1 to DIE 4.

The number of page rows included in one stripe page STPG may be changed depending on a data storage scheme (e.g., SLC, MLC, TLC, or the like). The illustration of FIG. 10 may correspond to a case where a data storage scheme is TLC (tripe-level cell). Therefore, one stripe page STPG may include three page rows. For example, a first stripe page STPG may include three page rows which are assigned numbers 1, 2 and 3.

In FIG. 10, numbers 1, 2, 3, 4, 5 and 6 assigned to each of the plurality of dies DIE 1 to DIE 4 may be numbers that denote the row orders of a plurality of page rows. Namely, in FIG. 10, the numbers 1, 2, 3, 4, 5 and 6 assigned to each of the plurality of dies DIE 1 to DIE 4 may be numbers that denote the row orders of the plurality of page rows included in the four planes PLN 1 to PLN 4 of each of the plurality of dies DIE 1 to DIE 4.

In FIG. 10, each small box in each of the plurality of dies DIE 1 to DIE 4 indicates a corresponding page row in a corresponding die. For example, the small box given with the number 1 in the first die DIE 1 corresponds to a first page row existing over the four planes PLN 1 to PLN 4 of the first die DIE 1.

As described above, the cache-based page status information management in accordance with the embodiments of the disclosure is implemented in the unit of stripe page STPG. Therefore, the CT caches information necessary to update the VPT, in the unit of stripe page STPG.

In this case, when information necessary to update the VPT are cached in the CT, the corresponding information may be cached in the CT in liaison with cache indexes that are defined by combinations of super block indexes and stripe page indexes, so that the information may be checked in terms of to which stripe page STPG in which super block SBLK they correspond.

In other words, the information included in the CT may be stored in liaison with cache indexes that are defined by combinations of super block indexes and stripe page indexes.

Figure 11:
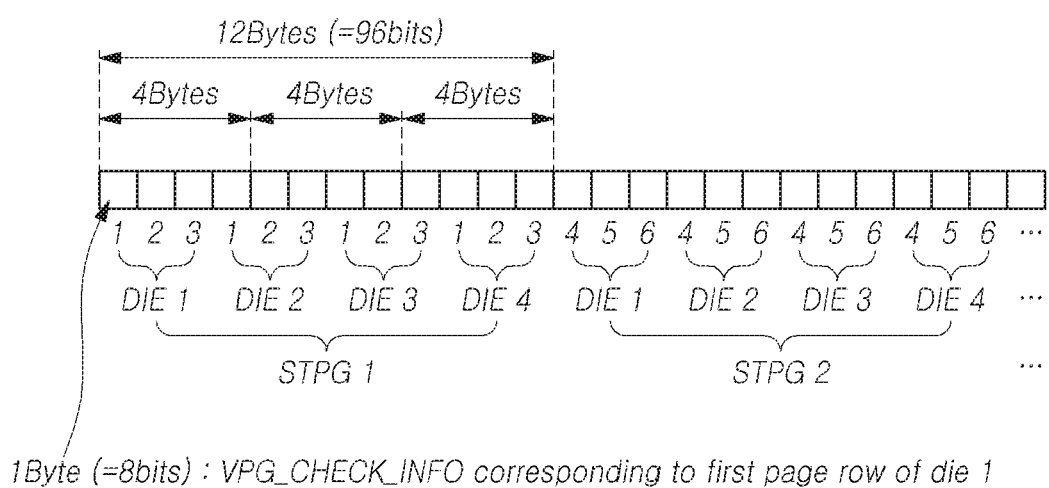
FIG. 11 is a diagram illustrating a structure of a valid page table stored and managed in a first memory for the cache-based page status information management in accordance with the embodiments of the disclosure.

FIG. 11 is a diagram illustrating a structure of a valid page table VPT for the cache-based page status information management in accordance with the embodiments of the disclosure.

Referring to FIG. 11, in the valid page table VPT, valid page checking information (page status information) VPG_CHECK_INFO of pages PG included in a stripe page STPG may be stored in the unit of a stripe page STPG.

For example, the valid page table VPT may include valid page checking information VPG_CHECK_INFO of pages PG included in a first stripe page STPG 1, valid page checking information VPG_CHECK_INFO of pages PG included in a second stripe page STPG 2, and so forth.

In the illustration of FIG. 11, four dies DIE 1 to DIE 4 exist in the memory device 110, a data storage scheme is triple-level cell (TLC), four planes PLN 1 to PLN 4 exist in each of the four dies DIE 1 to DIE 4, a size of one page (a size of one page data) is 8 K Bytes (8 KB), and a size corresponding to one bit (a size of data to be expressed by 1 bit) in the valid page table VPT is 4 K Bytes (4 KB).

According to such illustration, in the valid page table VPT, a size of the valid page checking information VPG_CHECK_INFO stored in each of a plurality of stripe pages STPG 1, STPG 2, . . . in one super block SBLK may correspond to 12 Bytes (=96 bits).

That is, the number of bits of the valid page checking information VPG_CHECK_INFO corresponding to each of the plurality of stripe pages STPG 1, STPG 2, . . . in one super block SBLK may be defined by a size corresponding to 1 bit (a data size corresponding to 1 bit, 4 K Bytes (4 KB) in the illustration) in the valid page table VPT, a page size (8 K Bytes (8 KB)), the number (4) of dies, the number (4) of planes per die, and the number (3) of page rows included in each of the plurality of stripe pages STPG 1, STPG 2, depending on a data storage scheme (TLC).

In the valid page table VPT, the number Nb of bits corresponding to each of the plurality of stripe pages STPG 1, STPG 2, . . . in one super block SBLK may be calculated as follows.

$$Nb=4*3*4*1*(8\ KB/4\ KB)=96\ bits=12\ Bytes$$

In the valid page table VPT, the number Nb of bits corresponding to each of the plurality of stripe pages STPG 1, STPG 2, . . . is the number of bits necessary to express the valid page checking information VPG_CHECK_INFO of each of the plurality of stripe pages STPG 1, STPG 2, . . . in the valid page table VPT.

Referring to FIG. 11, the first stripe page STPG 1 may include three page rows (page row numbers: 1, 2 and 3) included in each of the four dies DIE 1 to DIE 4. Namely, the first stripe page STPG 1 may include a total of 12 page rows. Each of the 12 page rows included in the first stripe page STPG 1 is illustrated as one box in FIG. 10.

Thus, the valid page checking information VPG_CHECK_INFO stored in each of the 12 page rows included in the first stripe page STPG 1 may have a size of 8 bits (=96/12), that is, 1 Byte (=12/12).

Referring to FIG. 11, in the first box of the first stripe page STPG 1, there may be stored the valid page checking information VPG_CHECK_INFO of four respective pages PG included in the first page row (page row number: 1) of the first die DIE 1.

Referring to FIG. 11, because each of the four dies DIE 1 to DIE 4 of the first stripe page STPG 1 includes three page rows (page row numbers: 1, 2 and 3) and each of the total of 12 page rows included in the first stripe page STPG 1 includes four pages PG positioned in the four planes PLN 1 to PLN 4, the first stripe page STPG 1 may include a total of 48 pages (=12*4).

According to this fact, valid page checking information VPG_CHECK_INFO of 48 pages PG may be expressed by 96 bits (12 Bytes). In this case, in order to express a valid page checking information VPG_CHECK_INFO of one page PG, 2 bits (=96/48) are necessary.

For example, read and write of the first memory 610 may be implemented in the unit of 4 Bytes. That is, valid page checking information VPG_CHECK_INFO may be updated in the unit of 4 Bytes.

Figure 12:
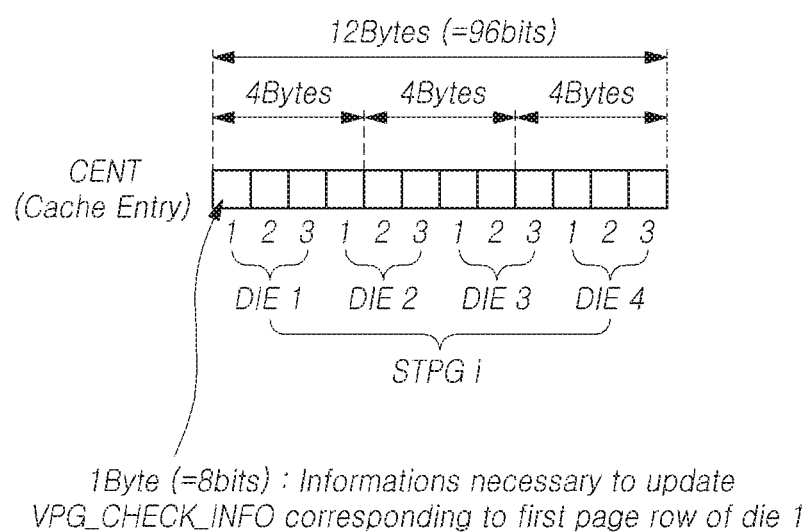
FIG. 12 is a diagram illustrating a basic structure of a cache entry of a cache table cached and managed in a second memory for the cache-based page status information management in accordance with the embodiments of the disclosure.

FIG. 12 is a diagram illustrating a basic structure of a cache entry CENT of a cache table CT cached and managed in the second memory 620 for the cache-based page status information management in accordance with the embodiments of the disclosure.

Referring to FIG. 12, the cache table CT may include one or more cache entries CENT.

Each of the cache entries CENT corresponds to any one stripe page STPG i.

Each of the cache entries CENT is similar to a part corresponding to one stripe page STPG in the valid page table VPT.

A structure and size of each of the cache entries CENT may be basically the same as the structure and size of the part corresponding to one stripe page STPG in the valid page table VPT.

For example, the number Nb of bits corresponding to each of the plurality of stripe pages STPG 1, STPG 2, . . . in the valid page table VPT may be the same as the number of bits corresponding to a corresponding stripe page STPG in each of the cache entries CENT of the cache table CT.

However, information included in each of the cache entries CENT may be different from information included in the part corresponding to one stripe page STPG in the valid page table VPT.

The information included in the part corresponding to one stripe page STPG in the valid page table VPT are the valid page checking information VPG_CHECK_INFO of the pages PG included in one stripe page STPG.

As compared with this, the information included in each cache entry CENT are information necessary to update the entirety or some of the valid page checking information VPG_CHECK_INFO of the pages PG included in a corresponding stripe page STPG.

The information included in each cache entry CENT (that is, the information necessary to update the entirety or some of the valid page checking information VPG_CHECK_INFO of the pages PG included in a stripe page STPG corresponding to each cache entry CENT) may include new write information NEW_WRT_INFO indicating that data are newly written in the corresponding pages PG, and invalid page change information IVPG_CHANGE_INFO indicating that the corresponding pages PG are changed from valid pages to invalid pages.

Figure 13:
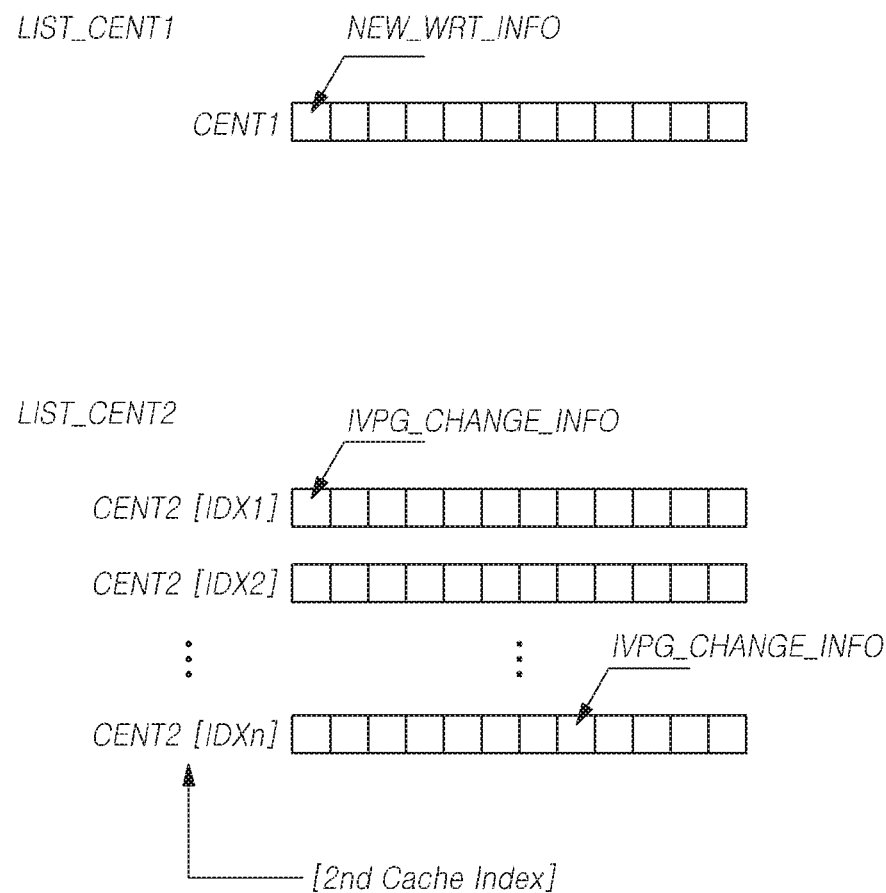
FIG. 13 is a diagram of two cache entries of the cache table cached and managed in the second memory for the cache-based page status information management in accordance with the embodiments of the disclosure.
Figure 14:
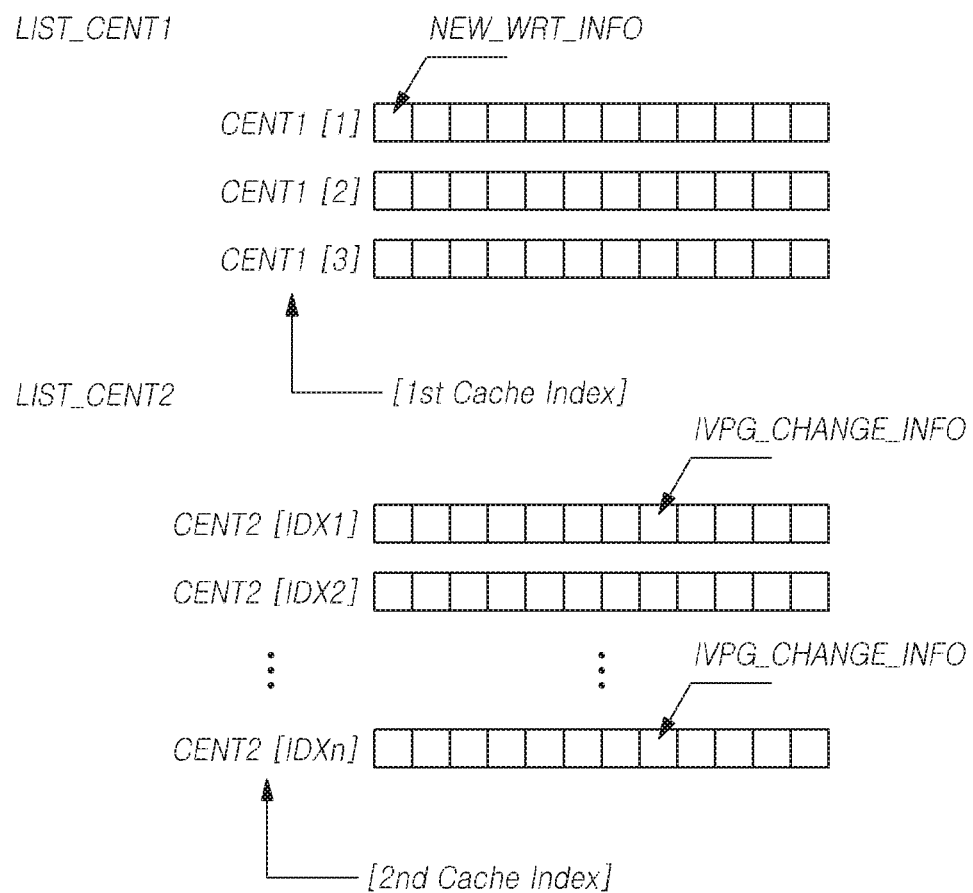
FIG. 14 is another diagram of two cache entries of the cache table cached and managed in the second memory for the cache-based page status information management in accordance with the embodiments of the disclosure.

FIGS. 13 and 14 are diagrams illustrating two cache entry lists LIST_CENT1 and LIST_CENT2 of the cache table CT for the cache-based page status information management in accordance with the embodiments of the disclosure.

FIG. 15 is a diagram of identification indexes of two respective cache entries CENT1 and CENT2 of the cache table CT for the cache-based page status information management in accordance with the embodiments of the disclosure.

Referring to FIGS. 13 and 14, the cache table CT may include a first cache entry list LIST_CENT1 and a second cache entry list LIST_CENT2. Each of the first and second cache entry lists LIST_CENT1 and LIST_CENT2 may include one or more cache entries each having the data structure as illustrated in FIG. 12.

The first cache entry list LIST_CENT1 has, in units of cache entries, information (new write information) necessary to update page status information (valid page checking information) for corresponding pages PG on the valid page table VPT, in relation with a new write-related operation.

The first cache entry list LIST_CENT1 has, in units of cache entries, information (that is, a new write information) necessary to update a page status information (a valid page checking information) for a specific page PG on the valid page table VPT, when the corresponding page PG is firstly and newly written with data. The other pages PG included in a stripe page STPG in which the corresponding page PG is included may be pages which are already written with data.

The second cache entry list LIST_CENT2 has, in units of cache entries, information (invalid page change information) necessary to update page status information (valid page checking information) for pages PG which had already been written in the past.

When a page PG which had already been written with data in the past, a cache entry corresponding to the page PG might have already been included in the first cache entry list LIST_CENT1 at a past time, and the second cache entry list LIST_CENT2 may have, in units of cache entries, information (that is, an invalid page change information) meaning that a corresponding information (information corresponding to the corresponding page PG) on the cache entry of the first cache entry list LIST_CENT1 is changed to an invalid page IVPG.

When a cache entry (hereinafter, referred to as a first cache entry) is included in the first cache entry list LIST_CENT1, since information are sequentially written as bits in the first cache entry, a cache hit may occur in most cases.

When the first cache entry is included in the first cache entry list LIST_CENT1, since accesses to the first memory 610 are sequentially made, a cache may be used by one stripe page STPG.

When a cache entry (hereinafter, referred to as a second cache entry) is included in the second cache entry list LIST_CENT2, a pattern with a locality may exhibit a high level of cache hit rate.

A second cache entry included in the second cache entry list LIST_CENT2 corresponds to a single stripe page STPG. The second cache entry list LIST_CENT2 may include a plurality of second cache entries respectively corresponding to a plurality of stripe pages STPG, a cache hit rate may be increased even when accesses to the valid page table VPT are randomly made.

As illustrated in FIG. 13, the first cache entry list LIST_CENT1 may include one first cache entry CENT1. As illustrated in FIG. 14, the first cache entry list LIST_CENT1 may include at least two first cache entries CENT1 [1], CENT1 [2] and CENT1 [3].

As illustrated in FIGS. 13 and 14, the second cache entry list LIST_CENT2 may include a plurality of second cache entries CENT2 [IDX1], CENT2 [IDX2], . . . , CENT2 [IDXn] (n is a natural number of 2 or greater).

As described above, each of the plurality of stripe pages STPG 1, STPG 2, . . . may include at least two pages PG. Namely, in the memory device 110, a plurality of pages PG in one super block SBLK may be grouped into the plurality of stripe pages STPG 1, STPG 2, . . . .

Referring to FIGS. 13 and 14, one first cache entry CENT1 or each of at least two first cache entries CENT1 [1], CENT1 [2] and CENT1 [3] may correspond to one stripe page STPG.

Referring to FIGS. 13 and 14, each of the second cache entries CENT2 [IDX1], CENT2 [IDX2], . . . , CENT2 [IDXn] may correspond to one stripe page STPG.

Referring to FIG. 14, each of the at least two first cache entries CENT1 [1], CENT1 [2] and CENT1 [3] may be identified by a first cache index. According to the illustration of FIG. 14, in [1], [2] and [3], the numbers 1, 2 and 3 in the bracket [ ] correspond to first cache indexes.

Referring to FIGS. 13 and 14, each of the second cache entries CENT2 [IDX1], CENT2 [IDX2], . . . , CENT2 [IDXn] may be identified by a second cache index. According to the illustration of FIGS. 13 and 14, in [IDX1], [IDX2], . . . , [IDXn], the symbols IDX1, IDX2, . . . , IDXn in the bracket [ ] correspond to second cache indexes.

Referring to FIG. 15, for instance, the at least two first cache entries CENT1 [1], CENT1 [2] and CENT1 [3] may correspond to at least two operation events. The at least two first cache entries CENT1 [1], CENT1 [2] and CENT1 [3] may be identified by the first cache indexes (illustration of FIG. 14: the numbers 1, 2 and 3 in the bracket [ ]) indicating operation events that are distinguished from one another.

For example, the at least two operation events may include at least two among a write operation event, a garbage collection (G/C) operation event and a refresh operation event as write-related operation events.

According to the above descriptions, at least two first cache indexes (the numbers 1, 2 and 3 in the bracket [ ]) may correspond to at least two operation event indexes.

According to the illustration of FIG. 15, if a first cache index is 1, the corresponding first cache entry CENT1 [1] may correspond to a garbage collection (G/C) operation event. If a first cache index is 2, the corresponding first cache entry CENT1 [2] may correspond to a write operation event. If a first cache index is 3, the corresponding first cache entry CENT1 [3] may correspond to a refresh operation event.

Each of the second cache entries CENT2 [IDX1], CENT2 [IDX2], ..., CENT2 [IDXn] may correspond to a specific stripe page STPG in a specific super block SBLK.

Therefore, the plurality of second cache entries CENT2 [IDX1], CENT2 [IDX2], ..., CENT2 [IDXn] may be identified by second cache indexes IDX1, IDX2, ..., IDXn each of which is defined by a combination of a super block index [SBLK Index] as an identifier of a super block SBLK and a stripe page index [STPG Index] as an identifier of a stripe page STPG. That is, the second cache indexes IDX1, IDX2, ..., IDXn may be distinguished from one another by combinations of super block indexes [SBLK Index] and stripe page indexes [STPG Index].

The one first cache entry CENT1 or each of the at least two first cache entries CENT1 [1], CENT1 [2] and CENT1 [3] may include new write information NEW_WRT_INFO of at least two pages PG in a corresponding stripe page STPG among the plurality of stripe pages STPG 1, STPG 2, .... The new write information NEW_WRT_INFO for a corresponding page PG may be one among information necessary to update a valid page checking information VPG_CHECK_INFO as a page status information for the corresponding page PG.

Each of the second cache entries CENT2 [IDX1], CENT2 [IDX2], ..., CENT2 [IDXn] may include invalid page change information IVPG_CHANGE_INFO of at least two pages PG in a corresponding stripe page STPG among the plurality of stripe pages STPG 1, STPG 2, ....

The invalid page change information IVPG_CHANGE_INFO for a corresponding page PG may be one among information necessary to update a valid page checking information VPG_CHECK_INFO as a page status information for the corresponding page PG.

Hereinbelow, a method of updating the one first cache entry CENT1 or the at least two first cache entries CENT1 [1], CENT1 [2] and CENT1 [3] included in the cache table CT and, in relation with the method, a method of updating the valid page table VPT will be described in further detail with reference to FIGS. 16 to 20. Hereinbelow, the cache table CT includes three first cache entries CENT1 [1], CENT1 [2] and CENT1 [3].

In succession, a method of updating the plurality of second cache entries CENT2 [IDX1], CENT2 [IDX2], ..., CENT2 [IDXn] included in the cache table CT and, in relation with the method, a method of updating the valid page table VPT will be described in further detail with reference to FIGS. 21 to 26.

Figure 16:
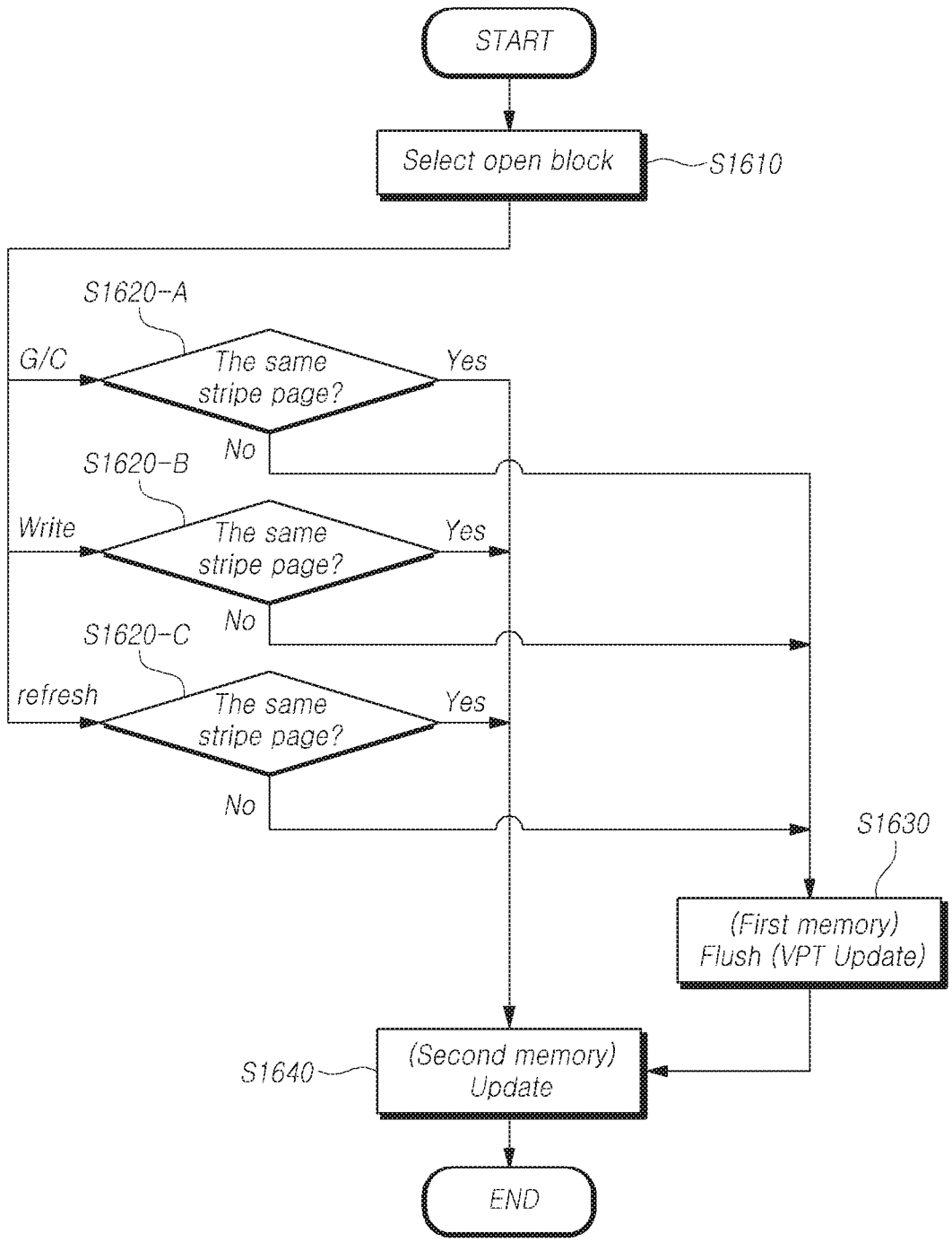
FIG. 16 is a flow chart of a cache-based page status information management method related with a first cache entry list in accordance with embodiments of the disclosure.

FIG. 16 is a flow chart of a cache-based page status information management method related with the first cache entry list LIST_CENT1 in accordance with embodiments of the disclosure.

Referring to FIG. 16, the first cache entry list LIST_CENT1 caches information (new write information) necessary to update page status information (valid page checking information) for corresponding pages PG on the valid page table VPT, in relation with a new write-related operation.

The first cache entry list LIST_CENT1 caches information (that is, new write information) necessary to update a page status information (valid page checking information) for a specific page PG on the valid page table VPT, when the corresponding page PG is firstly and newly written with data. The other pages PG included in a stripe page STPG in which the corresponding page PG is included may be pages which are already written with data.

Referring to FIG. 16, the cache-based page status information management method related with the first cache entry list LIST_CENT1 in accordance with the embodiments of the disclosure may include open block select step S1610, steps S1620-A, S1620-B and S1620-C where whether a specific stripe page STPG for which a corresponding operation event among operation events (G/C, write and refresh) is performed is included in the cache table CT and whether the specific stripe page STPG is the same as a stripe page STPG corresponding to the cache entry CENT1 [1], CENT1 [2] or CENT1 [3] corresponding to the corresponding operation event are determined, step S1630 in which the valid page table VPT is updated, and step S1640 in which the cache table CT is updated. More detailed descriptions will be made hereunder.

Referring to FIG. 16, after an open block is selected (S1610), when an operation event is a garbage collection (G/C) operation, the memory controller 120 determines whether the specific stripe page STPG for which the garbage collection operation as the corresponding operation event is performed is the same as a stripe page STPG corresponding to the first cache entry CENT1 [1] included in the cache table CT (S1620-A).

When it is determined as a result of determining at the step S1620-A that the specific stripe page STPG for which the garbage collection (G/C) operation as the corresponding operation event is performed is the same as the stripe page STPG corresponding to the first cache entry CENT1 [1], the memory controller 120 may perform a cache update operation of updating respective new write information NEW_WRT_INFO of at least two pages PG in the stripe page STPG included in the first cache entry CENT1 [1] (S1640). This process may be a process related with moving (copying) valid pages VPG to another memory block BLK when performing the garbage collection operation.

When the first cache entry CENT1 [1] is empty, the memory controller 120 may perform a cache update operation of updating respective new write information NEW_WRT_INFO of at least two pages PG in the stripe page STPG on which the garbage collection operation is performed in the first cache entry CENT1 [1] (S1640).

When it is determined as a result of determining at the step S1620-A that the specific stripe page STPG for which the garbage collection (G/C) operation as the corresponding operation event is performed is different from the stripe page STPG corresponding to the first cache entry CENT1 [1], the memory controller 120 may perform a flush operation of updating the valid page table VPT, based on respective new write information NEW_WRT_INFO of at least two pages PG in the stripe page STPG included in the first cache entry CENT1 [1] (S1630), and then, may perform a cache update operation of updating the first cache entry CENT1 [1] to allow the first cache entry CENT1 [1] to include respective new write information NEW_WRT_INFO of at least two pages PG in the specific stripe page STPG on which the garbage collection operation is performed (S1640).

On the other hand, after an open block is selected (S1610), when an operation event is a write operation, the memory controller 120 determines whether the specific stripe page STPG for which the write operation as the corresponding operation event is performed is the same as a stripe page STPG corresponding to the first cache entry CENT1 [2] included in the cache table CT (S1620-B).

When it is determined as a result of determining at the step S1620-B that the specific stripe page STPG for which the write operation as the corresponding operation event is performed is the same as the stripe page STPG corresponding to the first cache entry CENT1 [2], the memory controller 120 may perform a cache update operation of updating respective new write information NEW_WRT_INFO of at least two pages PG in the stripe page STPG included in the first cache entry CENT1 [2] (S1640).

When the first cache entry CENT1 [2] is empty, the memory controller 120 may perform a cache update operation of updating respective new write information NEW_WRT_INFO of at least two pages PG in the stripe page STPG on which the write operation is performed in the first cache entry CENT1 [2] (S1640).

When it is determined as a result of determining at the step S1620-B that the specific stripe page STPG on which the write operation is performed is different from the stripe page STPG corresponding to the first cache entry CENT1 [2], the memory controller 120 may perform a flush operation of updating the valid page table VPT, based on respective new write information NEW_WRT_INFO of at least two pages PG in the stripe page STPG included in the first cache entry CENT1 [2] (S1630), and then, may perform a cache update operation of updating the first cache entry CENT1 [2] to allow the first cache entry CENT1 [2] to include respective new write information NEW_WRT_INFO of at least two pages PG in the specific stripe page STPG on which the write operation is performed (S1640).

On the other hand, after an open block is selected (S1610), when an operation event is a refresh operation, the memory controller 120 determines whether the specific stripe page STPG for which the refresh operation as the corresponding operation event is performed is the same as a stripe page STPG corresponding to the first cache entry CENT1 [3] included in the cache table CT (S1620-C).

When it is determined as a result of determining at the step S1620-C that the specific stripe page STPG for which the refresh operation as the corresponding operation event is performed is the same as the stripe page STPG corresponding to the first cache entry CENT1 [3], the memory controller 120 may perform a cache update operation of updating respective new write information NEW_WRT_INFO of at least two pages PG in the stripe page STPG on which the refresh operation is performed (S1640).

When the first cache entry CENT1 [3] is empty, the memory controller 120 may perform a cache update operation of updating respective new write information NEW_WRT_INFO of at least two pages PG in the stripe page STPG on which the refresh operation is performed in the first cache entry CENT1 [3] (S1640).

When it is determined as a result of determining at the step S1620-C that the specific stripe page STPG on which the refresh operation is performed is different from the stripe page STPG corresponding to the first cache entry CENT1 [3], the memory controller 120 may perform a flush operation of updating the valid page table VPT, based on respective new write information NEW_WRT_INFO of at least two pages PG in the stripe page STPG included in the first cache entry CENT1 [3] (S1630), and then, may perform a cache update operation of updating the first cache entry CENT1 [3] to allow the first cache entry CENT1 [1] to include respective new write information NEW_WRT_INFO of at least two pages PG in the specific stripe page STPG on which the refresh operation is performed (S1640).

FIGS. 17 to 20 are diagrams of the update of the first cache entry list LIST_CENT1 and the update of the valid page table VPT related therewith, upon cache-based page status information management related with the first cache entry list LIST_CENT1 in accordance with the embodiments of the disclosure.

Figure 18:
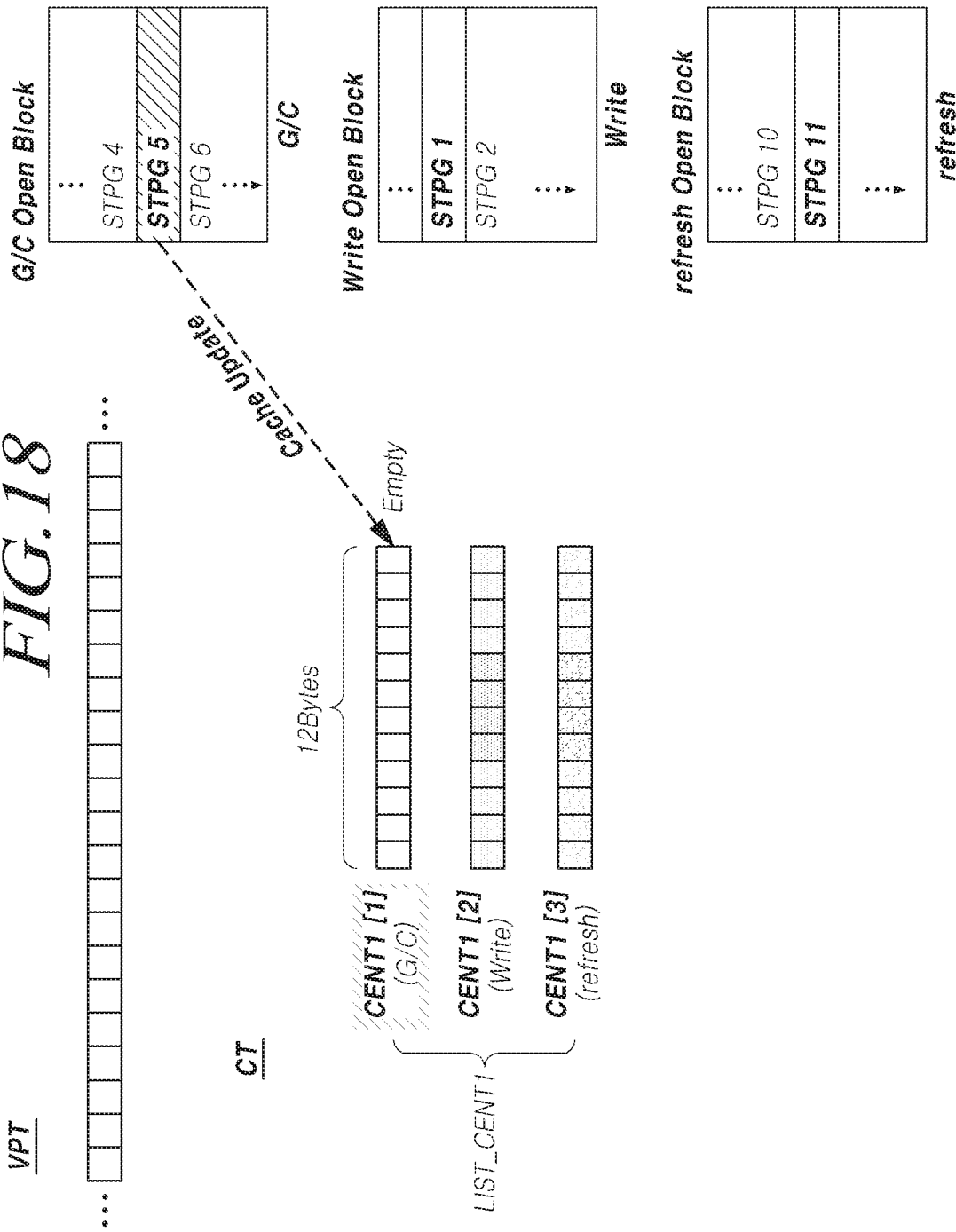
Figure 20:
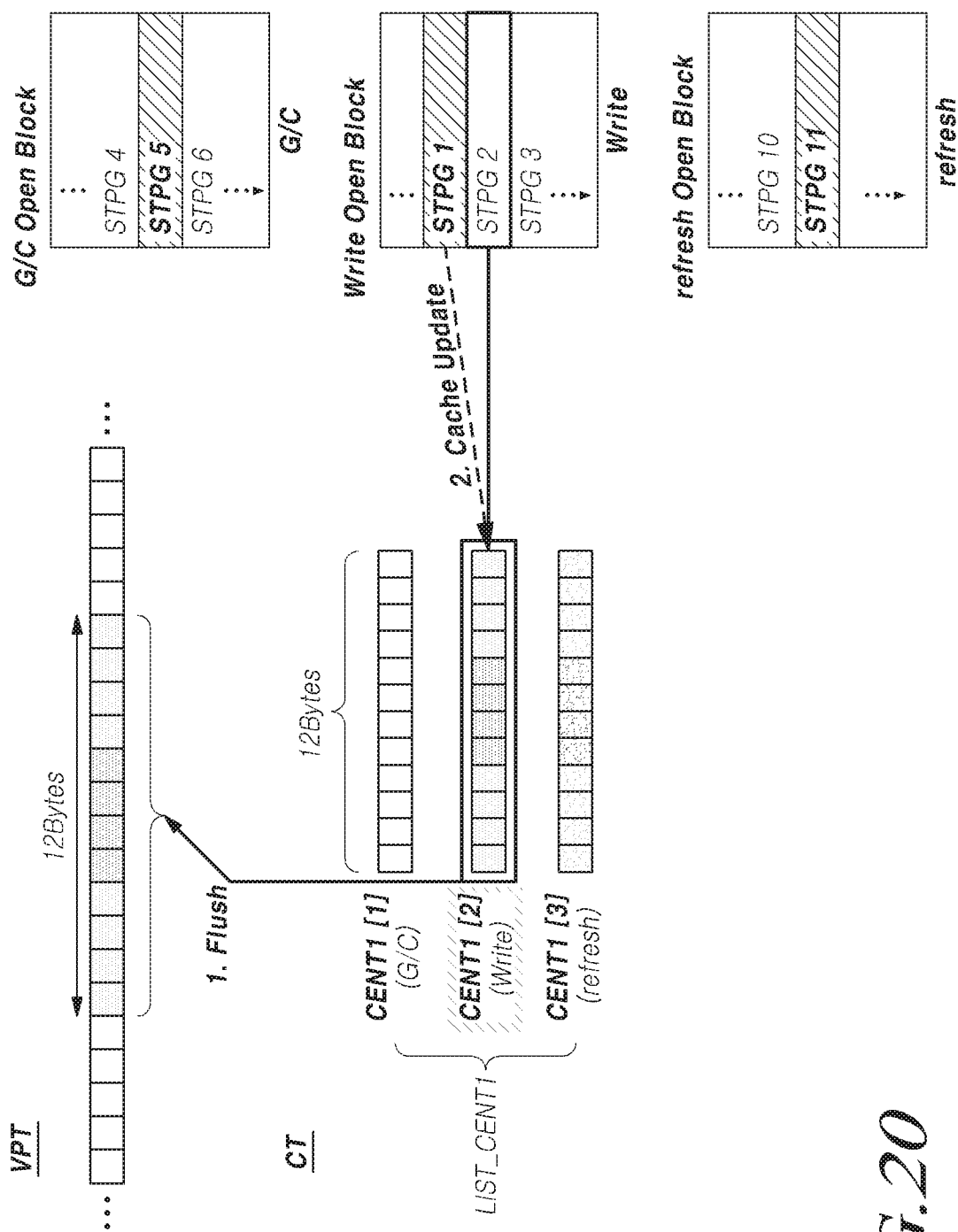

In FIG. 17, a state before the update of the first cache entry list LIST_CENT1 is performed. FIGS. 18 to 20 illustrate the performance of the update of the first cache entry list LIST_CENT1 with respect to three situations (a situation in which a first cache entry is empty, a situation in which a stripe page of a first cache entry is the same as a stripe page to be processed and a situation in which a stripe page of a first cache entry is different from a stripe page to be processed).

FIG. 17 illustrates a situation in which the valid page table VPT including valid page checking information of pages PG in the unit of stripe page STPG is stored in the first memory 610 and the cache table CT is stored in the second memory 620.

Referring to FIG. 17, in the valid page table VPT, initial states of the valid page checking information of the pages PG may be 0 (zero).

In the illustration of FIG. 17, the first cache entry list LIST_CENT1 includes three first cache entries CENT1 [1], CENT1 [2] and CENT1 [3] which are identified by three first cache indexes 1, 2 and 3 corresponding to three operation events (G/C, write and refresh).

According to the illustration of FIG. 17, each of the three first cache entries CENT1 [1], CENT1 [2] and CENT1 [3] included in the first cache entry list LIST_CENT1 may have a size of 12 Bytes as a storage space capable of caching new write information NEW_WRT_INFO of pages PG included in one stripe page.

According to the illustration of FIG. 17, among the three first cache entries CENT1 [1], CENT1 [2] and CENT1 [3] included in the first cache entry list LIST_CENT1, the first cache entry CENT1 [1] corresponding to a garbage collection operation event corresponds to new write information NEW_WRT_INFO being empty, the first cache entry CENT1 [2] corresponding to a write operation event corresponds to a second stripe page STPG 2 in a write open block and corresponds to new write information NEW_WRT_INFO for pages included in the second stripe page STPG 2 being cached, and the first cache entry CENT1 [3] corresponding to a refresh operation event corresponds to an eleventh stripe page STPG 11 in a refresh open block and corresponds to new write information NEW_WRT_INFO for pages included in the eleventh stripe page STPG 11 being cached.

In FIG. 17, the method for performing the update of the first cache entry list LIST_CENT1 with respect to each of the three situations will be described below with reference to FIGS. 18 to 20. FIG. 18 illustrates a first cache entry being empty, FIG. 19 illustrates a stripe page of a first cache entry being the same as a stripe page to be processed, and FIG. 20 illustrates a stripe page of a first cache entry being different from a stripe page to be processed.

FIG. 18 illustrates the first cache entry CENT1 [1] being empty before update.

Referring to FIG. 18, according to a garbage collection operation event, in order to move a page (a valid page VPG) existing in another block to a fifth stripe page STPG 5 in a garbage collection open block, a write operation is performed in the fifth stripe page STPG 5.

Due to this fact, when the first cache entry CENT1 [1] corresponding to the garbage collection operation event is empty, the memory controller 120 performs cache update for the first cache entry CENT1 [1].

By performing the cache update for the first cache entry CENT1 [1], the memory controller 120 may cache a new write information NEW_WRT_INFO (=1) indicating new write, in a corresponding portion in the first cache entry CENT1 [1] corresponding to a page(s) for which the write operation is performed in the fifth stripe page STPG 5. In a corresponding portion in the first cache entry CENT1 [1] corresponding to a page(s) for which the write operation is not performed in the fifth stripe page STPG 5, there may be cached a new write information NEW_WRT_INFO (=0) indicating no new write.

FIG. 19 illustrates the stripe page STPG 11 of the first cache entry CENT1 [3] being the same as a stripe page STPG 11 to be processed, before update.

Referring to FIG. 19, according to a refresh operation event, in order to refresh the eleventh stripe page STPG 11 in the refresh open block, a write operation is performed in the eleventh stripe page STPG 11.

When the first cache entry CENT1 [3] corresponding to the refresh operation event corresponds to the eleventh stripe page STPG 11 and already caches new write information NEW_WRT_INFO for pages PG in the eleventh stripe page STPG 11, as the write operation is performed in the eleventh stripe page STPG 11 as described above, the memory controller 120 performs cache update for the first cache entry CENT1 [3] corresponding to the eleventh stripe page STPG 11.

By performing the cache update for the first cache entry CENT1 [3], the memory controller 120 may cache new write information NEW_WRT_INFO (=1) indicating new write, in a corresponding portion in the first cache entry CENT1 [3] corresponding to a page(s) for which the write operation is performed in the eleventh stripe page STPG 11. In a corresponding portion in the first cache entry CENT1 [3] corresponding to a page(s) for which the write operation is not performed in the eleventh stripe page STPG 11, there may be cached new write information NEW_WRT_INFO (=0) indicating no new write.

FIG. 20 illustrates the stripe page STPG 2 of the first cache entry CENT1 [2] being different from a stripe page STPG 1 to be processed, before update.

Referring to FIG. 20, according to a write operation event, in order to write the first stripe page STPG 1 in the write open block, a write operation is performed in the first stripe page STPG 1.

Before performing the write operation, the first cache entry CENT1 [2] corresponding to the write operation event corresponds to the second stripe page STPG 2, and already caches new write information NEW_WRT_INFO for pages PG in the second stripe page STPG 2.

Therefore, in order to cache new write information NEW_WRT_INFO for pages PG in the first stripe page STPG 1, in the first cache entry CENT1 [2], the new write information NEW_WRT_INFO for the pages PG in the second stripe page STPG 2 which are already cached in the first cache entry CENT1 [2] need to be flushed to the first memory 610.

Thus, through a flush operation, the memory controller 120 updates valid page checking information VPG_CHECK_INFO for the pages PG in the second stripe page STPG 2, in the valid page table VPT, by using the new write information NEW_WRT_INFO for the pages PG in the second stripe page STPG 2 which are already cached in the first cache entry CENT1 [2].

Thereafter, by performing a cache update, the memory controller 120 caches the new write information NEW_WRT_INFO for the pages PG in the first stripe page STPG 1, in the first cache entry CENT1 [2].

By performing the cache update for the first cache entry CENT1 [2], the memory controller 120 may cache new write information NEW_WRT_INFO (=1) indicating new write, in a corresponding portion in the first cache entry CENT1 [2] corresponding to a page(s) for which the write operation is performed in the first stripe page STPG 1. In a corresponding portion in the first cache entry CENT1 [2] corresponding to a page(s) for which the write operation is not performed in the first stripe page STPG 1, there may be cached near write information NEW_WRT_INFO (=0) indicating no new write.

The schemes of the cache update and the flush operation described above may be changed as illustrated in FIGS. 18 to 20 depending on the first cache entry, that is, whether a first cache entry is empty, whether a stripe page of a first cache entry is the same as a stripe page to be processed and whether a stripe page of a first cache entry is different from a stripe page to be processed, regardless of the type of operation events (G/C, write or refresh).

Figure 21:
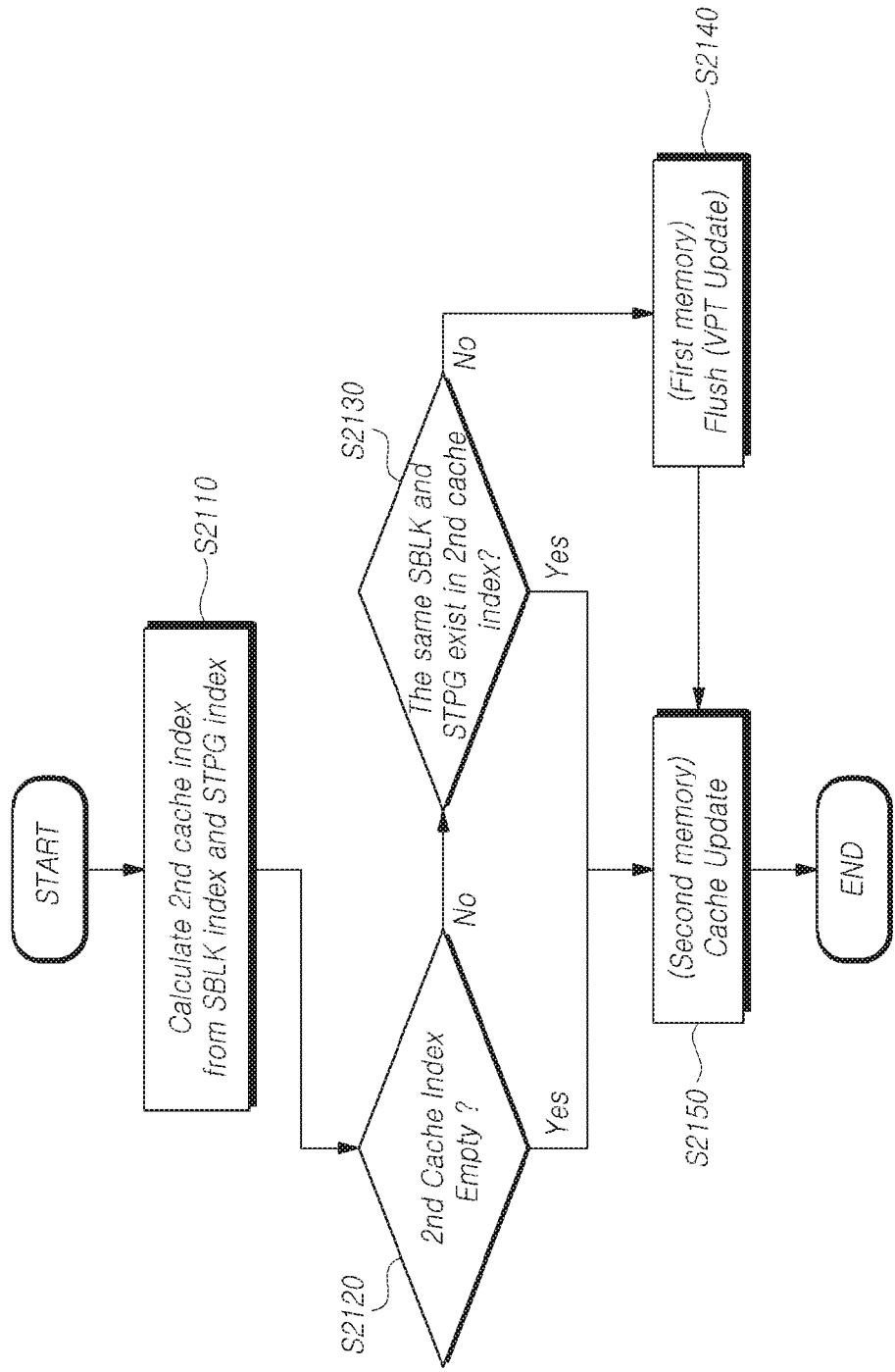
FIG. 21 is a flow chart of a cache-based page status information management method related with a second cache entry list in accordance with embodiments of the disclosure.

FIG. 21 is a flow chart a cache-based page status information management method related with the second cache entry list LIST_CENT2 in accordance with embodiments of the disclosure.

Referring to FIG. 21, the second cache entry list LIST_CENT2 caches information (invalid page change information) necessary to update page status information (valid page checking information) for pages PG which had already been written with data in the past.

A page PG which had already been written with data in the past might have already existed as a first cache entry included in a corresponding first cache entry list LIST_CENT1 at a past time, and the second cache entry list LIST_CENT2 may include information (that is, invalid page change information) meaning that corresponding information (information corresponding to the corresponding page PG) on the first cache entry having existed at the past time is changed to an invalid page IVPG.

Referring to FIG. 21, the cache-based page status information management method related with the second cache entry list LIST_CENT2 in accordance with the embodiments of the disclosure may proceed as follows.

The memory controller 120 calculates a second cache index (S2110).

The memory controller 120 determines whether the calculated second cache index is empty (S2120).

When it is determined as a result of the step S2120 that the calculated second cache index is empty, the memory controller 120 performs cache update for the second memory 620 (S2150).

When it is determined as a result of the step S2120 that the calculated second cache index is not empty, the memory controller 120 determines whether a second cache entry CENT2 identified by the calculated second cache index is the same as a specific stripe page STPG of a specific super block SBLK to be processed now (S2130).

When it is determined as a result of the step S2130 that the second cache entry CENT2 identified by the calculated second cache index is the same as the specific stripe page STPG of the specific super block SBLK to be processed now, the memory controller 120 performs cache update in the second memory 620 (S2150).

When it is determined as a result of the step S2130 that the second cache entry CENT2 identified by the calculated second cache index is not the same as the specific stripe page STPG of the specific super block SBLK to be processed now, the memory controller 120 performs a flush operation to the first memory 610 (S2140), and then, performs cache update in the second memory 620 (S2150).

More detailed descriptions will be made hereunder.

After controlling a write operation for a specific stripe page STPG in a specific super block SBLK, at the step S2110, the memory controller 120 may calculate a specific second cache index IDXk (k=1, 2, . . . ) which is defined by a combination of a super block index SBLK Index for the specific super block SBLK and a stripe page index STPG Index for the specific stripe page STPG.

At the step S2120, the memory controller 120 determines whether a second cache entry CENT2 [IDXk] corresponding to the specific second cache index IDXk is empty.

When it is determined as a result of the step S2120 that the second cache entry CENT2 [IDXk] corresponding to the specific second cache index IDXk is empty, the memory controller 120 performs cache update of updating invalid page change information IVPG_CHANGE_INFO of at least two respective pages in the specific stripe page STPG, in the second cache entry CENT2 [IDXk] corresponding to the specific second cache index IDXk (S2150).

When it is determined as a result of the step S2120 that the second cache entry CENT2 [IDXk] corresponding to the specific second cache index IDXk is not empty, the memory controller 120 determines whether the second cache entry CENT2 corresponding to the specific second cache index IDXk actually corresponds to the specific stripe page STPG (S2130). That is, at the step S2130, the memory controller 120 determines whether a stripe page which corresponds to the second cache entry CENT2 [IDXk] identified from the specific second cache index IDXk and is determined to be the same as the specific stripe page STPG of the specific super block SBLK to be currently processed.

When it is determined as a result of the step S2130 that the second cache entry CENT2 [IDXk] corresponding to the specific second cache index IDXk actually corresponds to the specific stripe page STPG, the memory controller 120 performs cache update of updating invalid page change information IVPG_CHANGE_INFO of at least two respective pages in the specific stripe page STPG, in the second cache entry CENT2 [IDXk] corresponding to the specific second cache index IDXk (S2150).

When it is determined as a result of the step S2130 that the second cache entry CENT2 [IDXk] corresponding to the specific second cache index IDXk does not actually correspond to the specific stripe page STPG, the memory controller 120 performs a flush operation of updating the valid page table VPT, based on invalid page change information IVPG_CHANGE_INFO already included in the second cache entry CENT2 [IDXk] corresponding to the specific second cache index IDXk (S2140). Then, in succession, the memory controller 120 performs cache update of updating invalid page change information IVPG_CHANGE_INFO of at least two respective pages in the specific stripe page STPG, in the second cache entry CENT2 [IDXk] corresponding to the specific second cache index IDXk (S2150).

At the step S2140, the memory controller 120 may perform the flush operation of updating the valid page table VPT through an exclusive OR operation on the invalid page change information IVPG_CHANGE_INFO already included in the second cache entry CENT2 [IDXk] corresponding to the specific second cache index IDXk and corresponding valid page checking information VPG_CHECK_INFO already included in the valid page table VPT.

FIGS. 22 to 26 are diagrams of the update of the second cache entry list LIST_CENT2 and the update of the valid page table VPT related therewith, upon cache-based page status information management related with the second cache entry list LIST_CENT2 in accordance with the embodiments of the disclosure.

Figure 22:
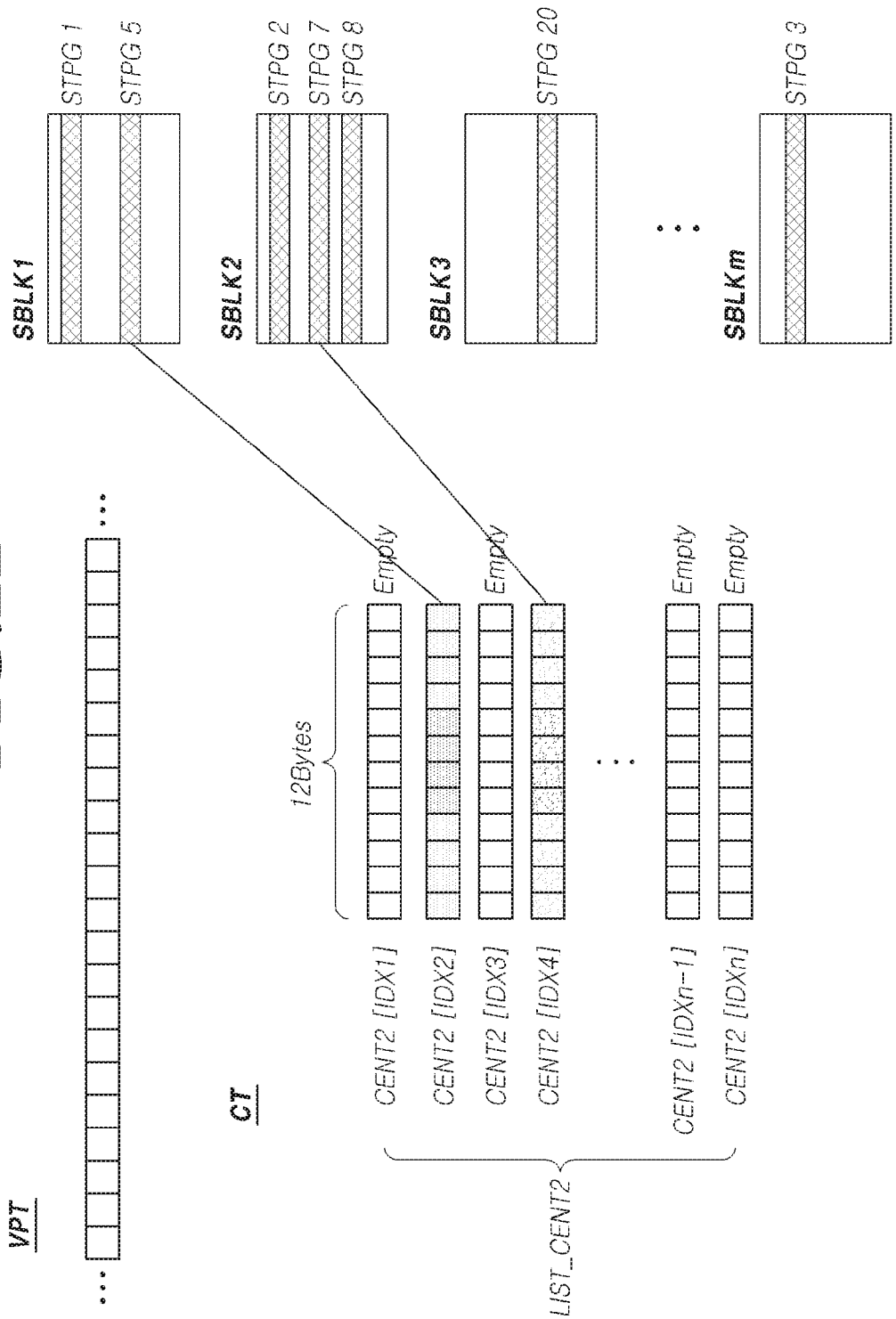
Figure 23:
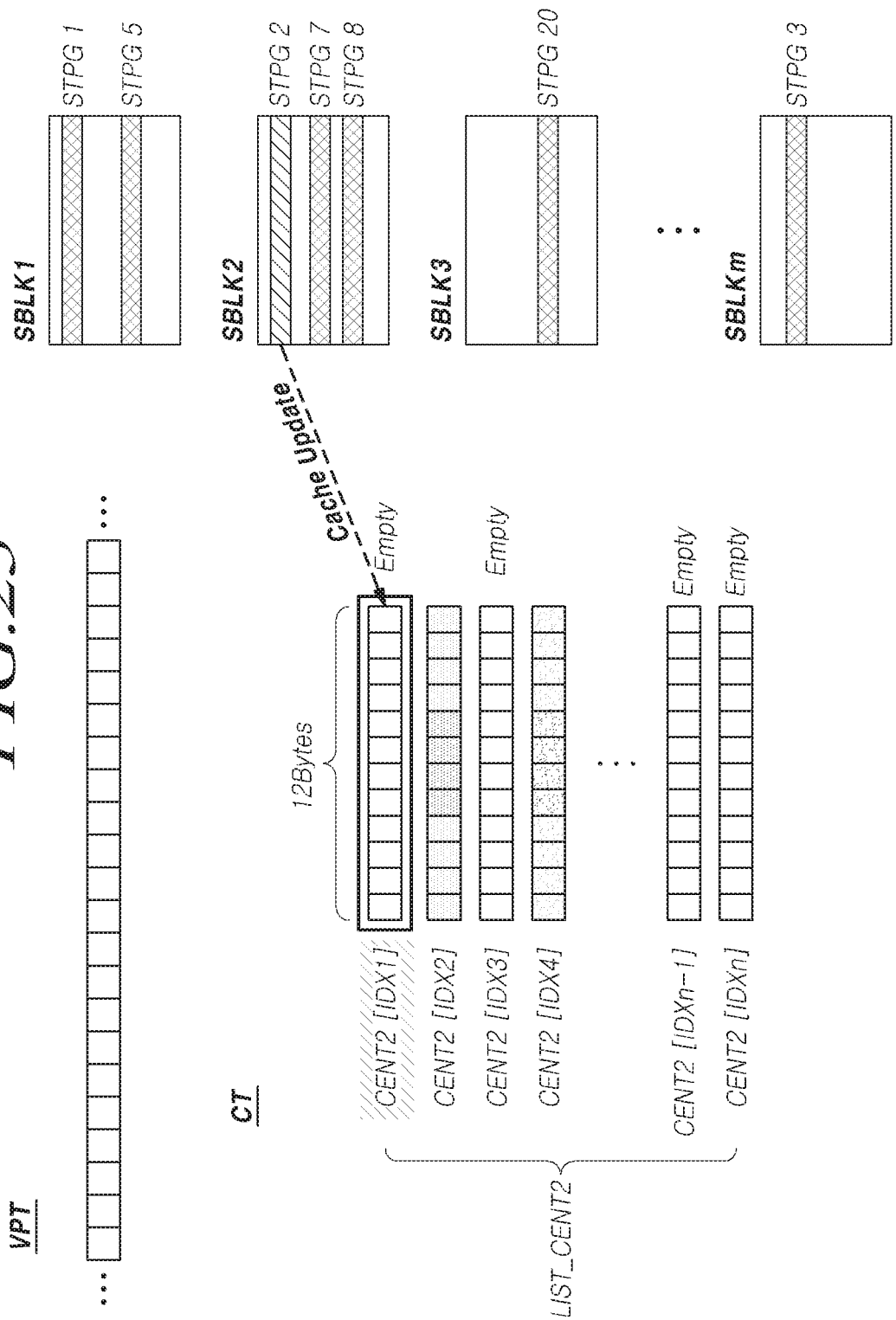
Figure 24:
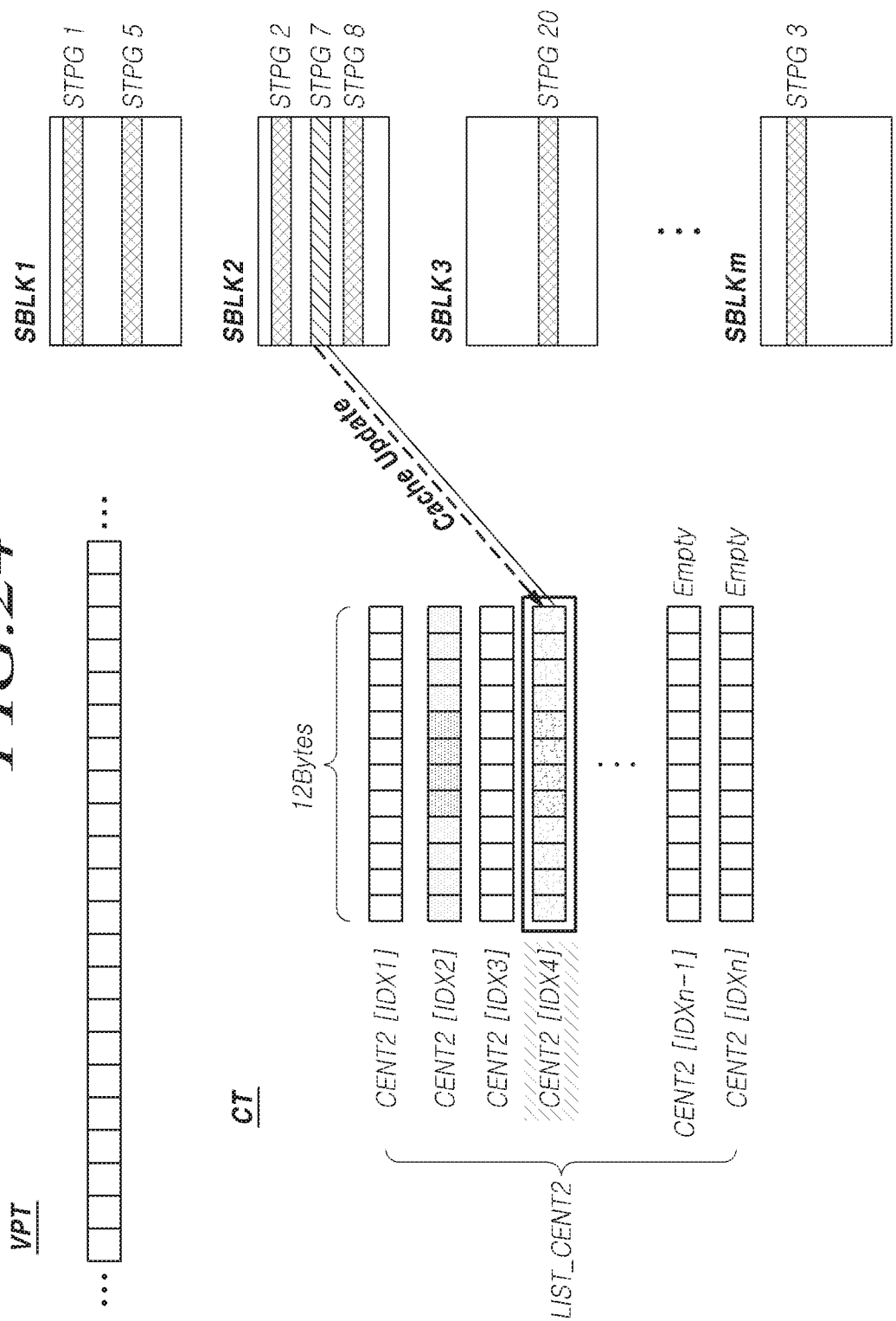
Figure 25:
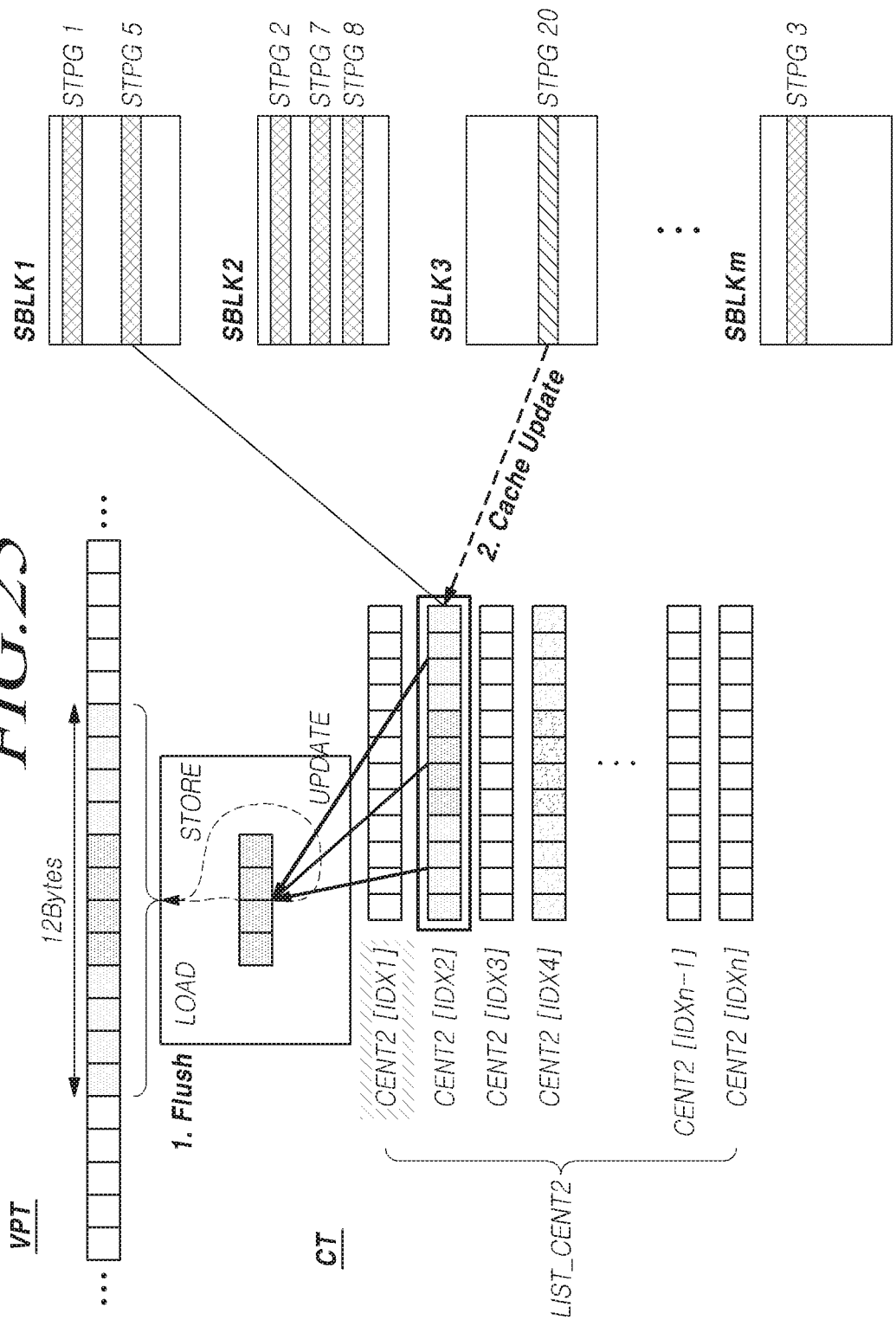

FIG. 22 illustrates the second cache entry list LIST_CENT2 before the update is performed, and FIGS. 23 to 25 illustrate the update of the second cache entry list LIST_CENT2 when a second cache entry is empty, when a stripe page of a second cache entry is the same as a specific stripe page to be processed and when a stripe page of a second cache entry is different from a specific stripe page to be processed.

FIG. 22 illustrates the valid page table VPT including valid page checking information of pages PG in the unit of stripe page STPG being stored in the first memory 610 and the cache table CT is stored in the second memory 620.

In the illustration of FIG. 22, the second cache entry list LIST_CENT2 includes n number of second cache entries CENT2 [IDX1], CENT2 [IDX2], . . . , CENT2 [IDXn]. For example, the second cache entry list LIST_CENT2 may include the second cache entries CENT2 [IDX1], CENT2 [IDX2], . . . , CENT2 [IDXn] corresponding to 10 super blocks SBLK and 100 stripe pages STPG. In this case, n=1000.

According to the illustration of FIG. 22, each of the n number of second cache entries CENT2 [IDX1], CENT2 [IDX2], . . . , CENT2 [IDXn] included in the second cache entry list LIST_CENT2 may have a size of 12 Bytes as a storage space capable of caching invalid page change information IVPG_CHANGE_INFO of pages PG included in one stripe page.

According to the illustration of FIG. 22, among the n number of second cache entries CENT2 [IDX1], CENT2 [IDX2], . . . , CENT2 [IDXn] included in the second cache entry list LIST_CENT2, the second cache entries CENT2 [IDX1], CENT2 [IDX3], CENT2 [IDXn−1] and CENT2 [IDXn] correspond to invalid page change information IVPG_CHANGE_INFO being empty. Further, the second cache entry CENT2 [IDX2] corresponding to a fifth stripe page STPG 5 in a first super block SBLK1 among m number of super blocks SBLK1 to SBLKm corresponds to invalid page change information IVPG_CHANGE_INFO for pages included in the fifth stripe page STPG 5 being cached, and the second cache entry CENT2 [IDX4] corresponding to a seventh stripe page STPG 7 in a second super block SBLK2 among the m number of super blocks SBLK1 to SBLKm corresponds to invalid page change information IVPG_CHANGE_INFO for pages included in the seventh stripe page STPG 7 being cached.

In FIG. 22, the method for performing the update of the second cache entry list LIST_CENT2 with respect to when a second cache entry is empty, when a stripe page of a second cache entry is the same as a specific stripe page to be processed and when a stripe page of a second cache entry is different from a specific stripe page to be processed, will be described below with reference to FIGS. 23 to 25.

FIG. 23 illustrates the second cache entry CENT2 [IDX1] being empty, before update.

Referring to FIG. 23, data is changed in a second stripe page STPG 2 in the second super block SBLK2 and thus at least one page PG in the second stripe page STPG 2 in the second super block SBLK2 is changed from a valid page VPG to an invalid page IVPG. Further, a second cache index which is defined by a combination of a super block index of the second super block SBLK2 and a stripe page index of the second stripe page STPG 2 is calculated as IDX1.

When the second cache entry CENT2 [IDX1] is identified by the second cache index IDX1 calculated in this way, since the second cache entry CENT2 [IDX1] is empty, the memory controller 120 matches the second cache entry CENT2 [IDX1] with the second stripe page STPG 2 in the second super block SBLK2 and caches invalid page change information IVPG_CHANGE_INFO of pages PG included in the second stripe page STPG 2 in the second super block SBLK2, in the second cache entry CENT2 [IDX1], through cache update. An invalid page change information IVPG_CHANGE_INFO may be 1 when a page which is changed from a valid page VPG to an invalid page IVPG, and an invalid page change information IVPG_CHANGE_INFO may be 0 when a page which is not changed from a valid page VPG to an invalid page IVPG.

FIG. 24 illustrates the stripe page STPG 7 of the second cache entry CENT2 [IDX4] being the same as a specific stripe page STPG to be processed, before update.

Referring to FIG. 24, data is changed in the seventh stripe page STPG 7 in the second super block SBLK2 and thus at least one page PG in the seventh stripe page STPG 7 in the second super block SBLK2 is changed from a valid page VPG to an invalid page IVPG. Further, a second cache index which is defined by a combination of a super block index of the second super block SBLK2 and a stripe page index of the seventh stripe page STPG 7 is calculated as IDX4.

When the second cache entry CENT2 [IDX4] is identified by the second cache index IDX4 calculated in this way, the memory controller 120 recognizes that the second cache entry CENT2 [IDX4] corresponds to the seventh stripe page STPG 7 in the second super block SBLK2 and already caches invalid page change information IVPG_CHANGE_INFO, that is, the stripe page STPG 7 corresponding to the second cache entry CENT2 [IDX4] is the same as the seventh stripe page STPG 7 in the second super block SBLK2 to be processed.

Accordingly, the memory controller 120 caches invalid page change information IVPG_CHANGE_INFO of pages PG included in the seventh stripe page STPG 7 in the second super block SBLK2, in the second cache entry CENT2 [IDX4], through cache update. An invalid page change information IVPG_CHANGE_INFO may be 1 when a page which is changed from a valid page VPG to an invalid page IVPG, and an invalid page change information IVPG_CHANGE_INFO may be 0 when a page which is not changed from a valid page VPG to an invalid page IVPG.

FIG. 25 illustrates the stripe page STPG 5 of the second cache entry CENT2 [IDX2] is different from a specific stripe page STPG 20 to be processed, before update.

Referring to FIG. 25, data is changed in the twentieth stripe page STPG 20 in a third super block SBLK3 and thus at least one page PG in the twentieth stripe page STPG 20 in the third super block SBLK3 is changed from a valid page VPG to an invalid page IVPG. Further, a second cache index which is defined by a combination of a super block index of the third super block SBLK3 and a stripe page index of the twentieth stripe page STPG 20 is calculated as IDX2.

When the second cache entry CENT2 [IDX2] is identified by the second cache index IDX2 calculated in this way, the memory controller 120 recognizes that the second cache entry CENT2 [IDX2] corresponds to the fifth stripe page STPG 5 in the first super block SBLK1 and already caches invalid page change information IVPG_CHANGE_INFO, that is, the stripe page STPG 5 corresponding to the second cache entry CENT2 [IDX2] is different from the twentieth stripe page STPG 20 in the third super block SBLK3 to be processed.

Therefore, through a flush operation, the memory controller 120 updates valid page checking information VPG_CHECK_INFO corresponding to the fifth stripe page STPG 5 in the first super block SBLK1 in the valid page table VPT, based on invalid page change information IVPG_CHANGE_INFO for the fifth stripe page STPG 5 in the first super block SBLK1 already cached in the second cache entry CENT2 [IDX2].

In relation with such a flush operation process, the memory controller 120 loads the valid page checking information VPG_CHECK_INFO corresponding to the fifth stripe page STPG 5 in the first super block SBLK1, from the valid page table VPT (LOAD step), performs an exclusive OR operation on the valid page checking information VPG_CHECK_INFO and the invalid page change information IVPG_CHANGE_INFO for the fifth stripe page STPG 5 in the first super block SBLK1 already cached in the second cache entry CENT2 [IDX2] (UPDATE step), and stores a calculation result in the valid page table VPT (STORE step). The exclusive OR operation for the flush operation will be described below with reference to FIG. 26.

After performing the flush operation, the memory controller 120 caches invalid page change information IVPG_CHANGE_INFO of pages PG included in the twentieth stripe page STPG 20 in the third super block SBLK3, in the second cache entry CENT2 [IDX2], through cache update. Invalid page change information IVPG_CHANGE_INFO may be 1 when a page which is changed from a valid page VPG to an invalid page IVPG, and an invalid page change information IVPG_CHANGE_INFO may be 0 when a page which is not changed from a valid page VPG to an invalid page IVPG.

FIG. 26 is a diagram illustrating an exclusive OR operation performed in a flush operation for the update of the valid page table VPT.

Referring to FIG. 26, the memory controller 120 may perform a flush operation by obtaining information to update, through an exclusive OR operation.

Referring to FIG. 26, the memory controller 120 loads corresponding valid page checking information VPG_CHECK_INFO (hexadecimals: 0x 01 00 0A 01, 0x 05 08 00 00 and 0x 0A 0C 00 03) for the fifth stripe page STPG 5 of the first super block SBLK1 which is already matched with the corresponding second cache entry CENT2 [IDX2], from the valid page table VPT of the first memory 610 (LOAD step).

The memory controller 120 performs an exclusive OR operation on the valid page checking information VPG_CHECK_INFO (hexadecimals: 0x 01 00 0A 01, 0x 05 08 00 00 and 0x 0A 0C 00 03) loaded from the valid page table VPT of the first memory 610 and invalid page change information IVPG_CHANGE_INFO (hexadecimals: 0x 01 00 02 00, 0x 01 08 00 00 and 0x 0A 0C 00 03) for the fifth stripe page STPG 5 of the first super block SBLK1 already correspondingly stored in the corresponding second cache entry CENT2 [IDX2] in the cache table CT, and thereby, obtains updated valid page checking information VPG_CHECK_INFO (hexadecimals: 0x 00 00 08 01, 0x 04 00 00 00 and 0x 00 00 00 00) (UPDATE step).

The memory controller 120 stores the valid page checking information VPG_CHECK_INFO (hexadecimals: 0x 00 00 08 01, 0x 04 00 00 00 and 0x 00 00 00 00) which are updated for the fifth stripe page STPG 5 of the first super block SBLK1, in the valid page table VPT (STORE step).

Figure 27:
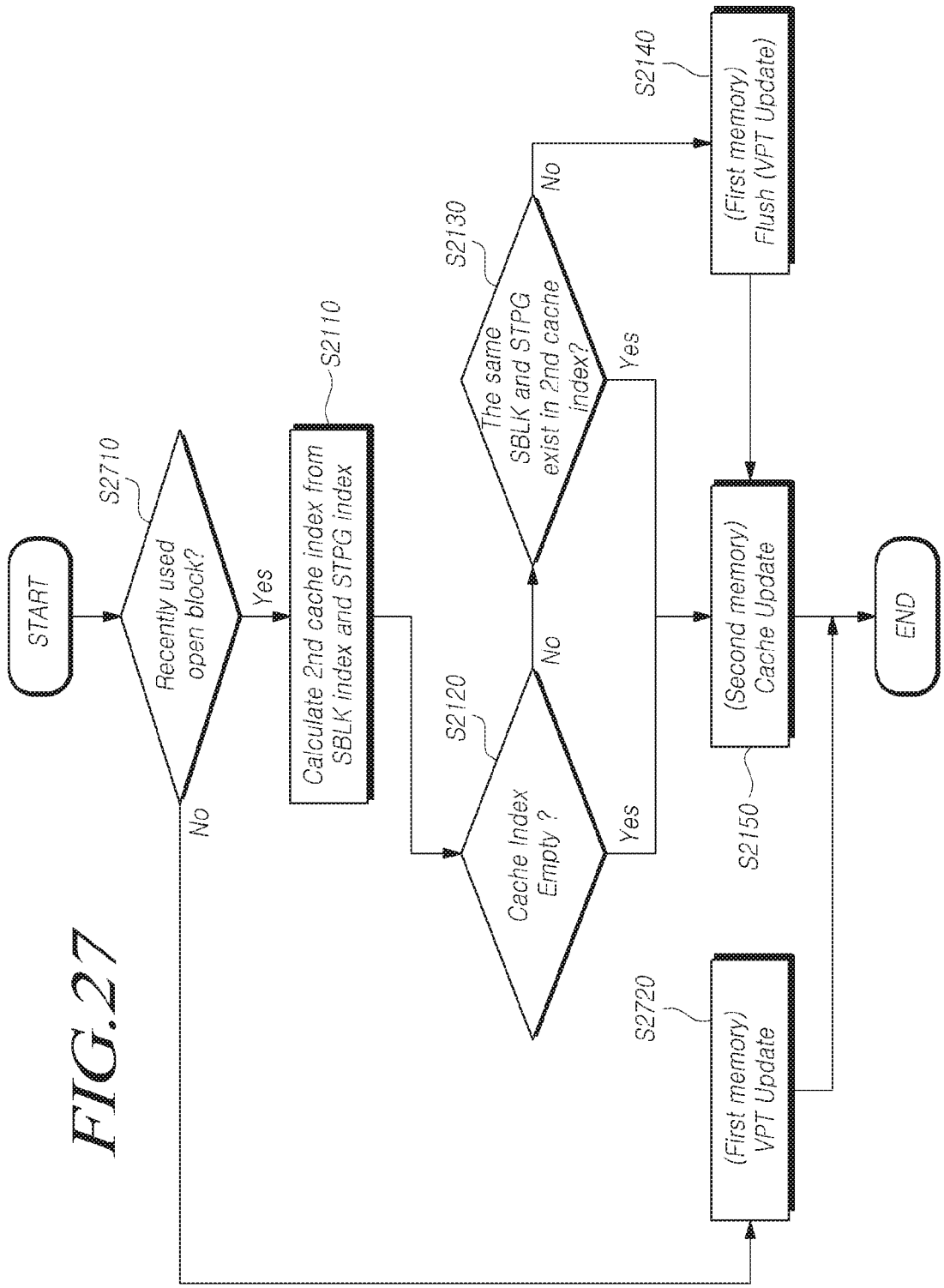
FIG. 27 is a flow chart of another cache-based page status information management method related with a second cache entry list in accordance with embodiments of the disclosure.
Figure 28:
FIG. 28 is a diagram of a recent open block index table for the cache-based page status information management related with the second cache entry list in accordance with the embodiments of the disclosure.

FIG. 27 is a flow chart of another cache-based page status information management method related with the second cache entry list LIST_CENT2 in accordance with embodiments of the disclosure. FIG. 28 is a diagram of a recent open block index table for the cache-based page status information management related with the second cache entry list LIST_CENT2 in accordance with the embodiments of the disclosure.

Referring to FIG. 27, the memory controller 120 may cache a plurality of second cache entries CENT2 corresponding to a preset number (e.g., 4) of recent super blocks based on latest write order, in the cache table CT.

Referring to FIG. 27, the cache-based page status information management method related with the second cache entry list LIST_CENT2 in accordance with the embodiments of the disclosure may further include, before the step S2110 of FIG. 21, step S2710 of determining whether a super block SBLK to be updated is a recently used open block.

When it is determined at the step S2710 that a super block SBLK to be updated is a recently used open block, the steps S2110, S2120, S2130, S2140 and S2150 may be performed after the step S2710.

When it is determined at the step S2710 that a super block SBLK to be updated is not a recently used open block, after the step S2710, without a cache update process, step S2720 in which the valid page table VPT is immediately updated by using invalid page change information IVPG_CHANGE_INFO related with the super block SBLK to be updated, may be performed.

At the step S2720, with respect to valid page checking information VPG_CHECK_INFO of respective pages in a super block different from recent super blocks as a preset number of recently used open blocks, the memory controller 120 may directly update the valid page checking information VPG_CHECK_INFO of the respective pages in the different super block included in the valid page table VPT, in the valid page table VPT, without a cache update process using the cache table CT.

Referring to the illustration of FIG. 28, when super blocks having super block indexes of 100, 110, 105, 104, 200, 220 and 130 are used as open blocks, a recent open block index table 2800 may store information (e.g., the super blocks indexes 104, 200, 220 and 130) on a preset number (e.g., 4) of recently used open blocks.

Thus, the memory controller 120 may be aware of the recently used open blocks by referring to the recent open block index table 2800, at the step S2710.

The memory controller 120 performs an update from the step S2110 for the super blocks having the super block indexes 104, 200, 220 and 130 (super blocks as recently used open blocks).

The memory controller 120 may immediately perform the step S2720 for the super blocks having the super block indexes 100, 110 and 105 (super blocks not as recently used open blocks).

Figure 29:
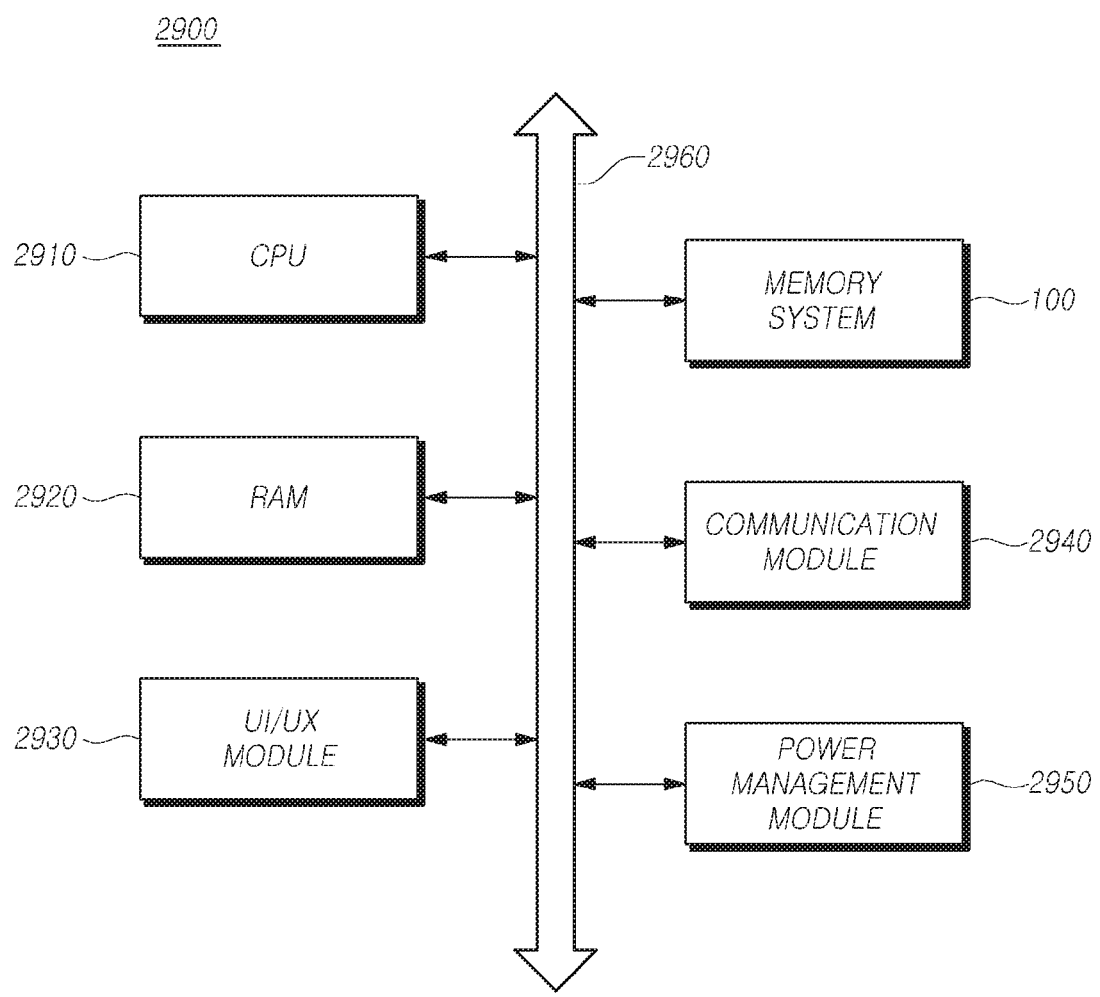
FIG. 29 is a block diagram schematically illustrating a computing system in accordance with embodiments of the disclosure.

FIG. 29 is a block diagram schematically illustrating a computing system 2900 in accordance with embodiments of the disclosure.

Referring to FIG. 29, the computing system 2900 in accordance with embodiments of the disclosure may include a memory system 100, a central processing unit (CPU) 2910 for controlling general operations of the computing system 2900, a RAM 2920 for storing data and information related with the operations of the computing system 2900, a UI/UX (user interface/user experience) module 2930 for providing use environment to a user, a communication module 2940 for communicating with an external device in a wired and/or wireless manner, and a power management module 2950 for managing power used by the computing system 2900, which are electrically coupled to a system bus 2960.

The computing system 2900 in accordance with the embodiments of the disclosure may include a PC (personal computer), a mobile terminal such as a smartphone and a tablet or various electronic devices.

The computing system 2900 in accordance with the embodiments may further include a battery for supplying an operating voltage, and may further include an application chipset, a graphic-related module, a camera image processor (CIS), a DRAM and so forth. Furthermore, the computing system 2900 may include other components.

The memory system 100 may include not only a device which stores data in a magnetic disk, such as a hard disk drive (HDD), but also a device which stores data in a nonvolatile memory, such as a solid state drive (SDD), a universal flash storage (UFS) device and an embedded MMC (eMMC) device. The nonvolatile memory may include a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and an FRAM (ferroelectric RAM). In addition, the memory system 100 may be realized as various types of storage devices, and may be mounted in various electronic devices.

The embodiments of the disclosure described above may provide the memory system 100, the memory controller 120 and the operating method thereof, which efficiently manage statuses of the pages PG in the memory device 110.

Also, the embodiments of the disclosure may provide the memory system 100, the memory controller 120 and the operating method thereof, which are capable of quickly and effectively updating status information (which may be valid page checking information) on the pages PG in the memory device 110.

Further, the embodiments of the disclosure may provide the memory system 100, the memory controller 120 and the operating method thereof, capable of improving write performance through effective management of page status information.

Moreover, the embodiments of the disclosure may provide the memory system 100, the memory controller 120 and the operating method thereof, which are capable of cache-based page status information management.

Moreover, the embodiments of the disclosure may provide the memory system 100, the memory controller 120 and the operating method thereof, which are capable of storing and managing page status information in the first memory 610 and caching and managing information necessary to update page status information, in the second memory 620 different from the first memory 610, for cache-based page status information management, thereby reducing an access count to the first memory 610 and through this, improving write performance.

Although exemplary embodiments have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted by the appended claims and encompass all equivalents falling within the scope of the appended claims.

What is claimed is:

1. A memory system comprising:
a memory device including a plurality of pages; and
a memory controller configured to control a write operation of the memory device,
wherein the memory controller manages statuses of the respective pages by referring to a first memory and a second memory,
wherein at least one of the first memory and the second memory is included inside the memory controller,
wherein the first memory stores a valid page table which includes valid page checking information of the respective pages indicating whether each of the respective pages is a valid page, and
wherein the second memory caches a cache table which includes information for updating a part of the valid page table and has a size smaller than the valid page table,
wherein the plurality of pages are grouped into a plurality of stripe pages,
wherein the cache table includes one or more first cache entries, and a plurality of second cache entries,
wherein each of the first cache entries includes new write information of at least two respective pages in a first stripe page among the plurality of stripe pages, and
wherein each of the second cache entries includes invalid page change information of at least two respective pages in a second stripe page among the plurality of stripe pages.

2. The memory system according to claim 1,
wherein the memory controller updates the valid page table based on the cache table, and
wherein the memory controller moves at least one valid page in any one first block which is checked as having an invalid page therein, to another block different from the first block, by referring to the updated valid page table; and resets an address for the at least one valid page.

3. The memory system according to claim 1, wherein the first memory is a dynamic RAM (DRAM), and the second memory is a static RAM (SRAM).

4. The memory system according to claim 1, wherein the number of bits corresponding to one stripe page in the valid page table is defined by a size corresponding to 1 bit in the valid page table, a page size, a number of dies and a number of planes per die.

5. The memory system according to claim 1,
wherein the at least two first cache entries correspond to at least two different operation events, respectively,
wherein the at least two first cache entries are identified by first cache indexes which indicate the operation events, respectively, and
wherein the at least two operation events include at least two among a write operation event, a garbage collection operation event and a refresh operation event.

6. The memory system according to claim 1,
wherein, after an open block is selected, when a specific stripe page for which the operation event is performed is the same as the first stripe page or the first cache entry is empty, the memory controller performs a cache update operation of updating new write information of at least two respective pages in the first stripe page included in the first cache entry, and
wherein, after the open block is selected, when the specific stripe page is different from the first stripe page, the memory controller performs a flush operation of updating the valid page table stored in the first memory based on new write information of at least two respective pages in the first stripe page included in the first cache entry, and performs a cache update operation of updating the first cache entry to allow the first cache entry to include new write information of at least two respective pages in the specific stripe page.

7. The memory system according to claim 1,
wherein the memory device comprises a plurality of memory blocks, and each of the plurality of memory blocks comprises a plurality of pages,
wherein the plurality of memory blocks are grouped into a plurality of super blocks,
wherein each of the plurality of super blocks comprises at least two stripe pages, and
wherein each of the second cache entries is identified by a second cache index which is defined by a combination of a super block index and a stripe page index.

8. The memory system according to claim 7,
wherein, after controlling a write operation of a specific stripe page in a specific super block, the memory controller calculates a specific second cache index which is defined by a combination of a super block index for the specific super block and a stripe page index for the specific stripe page,
wherein, when a second cache entry corresponding to the specific second cache index is empty, the memory controller performs cache update of updating invalid page change information of at least two respective pages in the specific stripe page, in the second cache entry corresponding to the specific second cache index,
wherein, when the second cache entry corresponding to the specific second cache index corresponds to the specific stripe page, the memory controller performs cache update of updating invalid page change information of at least two respective pages in the specific stripe page, in the second cache entry corresponding to the specific second cache index, and
wherein, when the second cache entry corresponding to the specific second cache index does not correspond to the specific stripe page, the memory controller performs a flush operation of updating the valid page table stored in the first memory, based on invalid page change information included in the second cache entry corresponding to the specific second cache index, and performs cache update of updating invalid page change information of at least two respective pages in the specific stripe page, in the second cache entry corresponding to the specific second cache index.

9. The memory system according to claim 8, wherein the memory controller performs the flush operation of updating the valid page table stored in the first memory through an exclusive OR operation on invalid page change information included in the second cache entry corresponding to the specific second cache index and corresponding valid page checking information included in the valid page table stored in the first memory.

10. The memory system according to claim 7,
wherein the plurality of second cache entries correspond to a preset number of recent super blocks, on which a write operation is most recently performed, and
wherein the memory controller directly updates, in the valid page table stored in the first memory, valid page checking information of the respective pages in a super block different from the recent super blocks.

11. A memory controller comprising:
a memory interface configured to communicate with a memory device including a plurality of pages;
a control circuit configured to control an operation of the memory device;
a first memory configured to store a valid page table which includes valid page checking information of the respective pages indicating whether each of the respective pages is a valid page; and
a second memory configured to cache a cache table which includes information for updating a part of the valid page table and has a size smaller than the valid page table,
wherein the control circuit manages statuses of the respective pages by referring to the first memory and the second memory,
wherein the plurality of pages are grouped into a plurality of stripe pages,
wherein the cache table includes one or more first cache entries, and a plurality of second cache entries,
wherein each of the first cache entries includes new write information of at least two respective pages in a first stripe page among the plurality of stripe pages, and
wherein each of the second cache entries includes invalid page change information of at least two respective pages in a second stripe page among the plurality of stripe pages.

12. The memory controller according to claim 11, wherein the memory controller moves at least one valid page checked as existing in a first block, to a second block, by referring to the updated valid page table; and resets an address for the at least one valid page.

13. The memory controller according to claim 11, wherein the number of bits corresponding to each of the plurality of stripe pages is defined by a size corresponding to 1 bit in the valid page table, a page size, a number of dies and a number of planes per die.

14. The memory controller according to claim 11,
wherein the at least two first cache entries correspond to at least two different operation events, respectively,
wherein the at least two first cache entries are identified by first cache indexes, which indicate the operation events, respectively, and
wherein the at least two operation events include at least two among a write operation event, a garbage collection operation event and a refresh operation event.

15. The memory controller according to claim 11,
wherein the memory device comprises a plurality of blocks, and each of the plurality of blocks comprises a plurality of pages,
wherein the plurality of blocks are grouped into a plurality of super blocks,
wherein each of the plurality of super blocks comprises at least two stripe pages, and
wherein each of the second cache entries is identified by a second cache index which is defined by a combination of a super block index and a stripe page index.

16. The memory controller according to claim 15,
wherein the plurality of second cache entries correspond to a preset number of recent super blocks, on which a write operation is most recently performed, and
wherein the memory controller directly updates, in the valid page table stored in the first memory, valid page checking information of the respective pages in a super block different from the recent super blocks.

17. A method for operating a memory controller for controlling a memory device, the method comprising:
controlling a write-related operation of the memory device; and
updating information stored in one of a first memory and a second memory to manage statuses of a plurality of pages of the memory device,
wherein the first memory stores a valid page table which includes page status information of the respective pages indicating whether each of the respective pages is a valid page, and
wherein the second memory caches a cache table which includes information for updating a part of the valid page table and has a size smaller than the valid page table,
wherein the plurality of pages are grouped into a plurality of stripe pages,
wherein the cache table includes one or more first cache entries, and a plurality of second cache entries,
wherein each of the first cache entries includes new write information of at least two respective pages in a first stripe page among the plurality of stripe pages, and
wherein each of the second cache entries includes invalid page change information of at least two respective pages in a second stripe page among the plurality of stripe pages.

18. The method according to claim 17, further comprising moving, after the updating, at least one valid page checked as existing in a first block, to a second block, by referring to the updated valid page table; and resetting an address for the at least one valid page.

* * * * *